June 21, 1960

G. K. JENSEN 2,942,107

READ-OUT SYSTEM

Filed Nov. 29, 1957

19 Sheets-Sheet 1

INVENTOR
GAROLD K. JENSEN
BY J. A. O'Donnell
Richard C Reed
ATTORNEYS

June 21, 1960 G. K. JENSEN 2,942,107

READ-OUT SYSTEM

Filed Nov. 29, 1957 19 Sheets-Sheet 2

INVENTOR
GAROLD K. JENSEN

BY J. A. O'Connell
Richard C. Reed

ATTORNEYS

June 21, 1960 G. K. JENSEN 2,942,107

READ-OUT SYSTEM

Filed Nov. 29, 1957 19 Sheets-Sheet 3

INVENTOR
GAROLD K. JENSEN

BY J. A. O'Connell
Richard C. Reed
ATTORNEYS

June 21, 1960 G. K. JENSEN 2,942,107

READ-OUT SYSTEM

Filed Nov. 29, 1957 19 Sheets-Sheet 4

INVENTOR
GAROLD K. JENSEN
BY J. A. O'Connell
Richard C. Reed
ATTORNEYS

June 21, 1960 G. K. JENSEN 2,942,107

READ-OUT SYSTEM

Filed Nov. 29, 1957 19 Sheets-Sheet 5

INVENTOR
GAROLD K. JENSEN

BY J. A. O'Connell
Richard C. Reed
ATTORNEYS

INVENTOR
GAROLD K. JENSEN
BY J. A. O'Connell
Richard C. Reed
ATTORNEYS

INVENTOR
GAROLD K. JENSEN
BY J. A. O'Connell
Richard C. Reed
ATTORNEYS

June 21, 1960 G. K. JENSEN 2,942,107

READ-OUT SYSTEM

Filed Nov. 29, 1957 19 Sheets-Sheet 8

INVENTOR
GAROLD K. JENSEN

BY J. A. O'Connell
Richard C. Reed
ATTORNEYS

June 21, 1960 G. K. JENSEN 2,942,107

READ-OUT SYSTEM

Filed Nov. 29, 1957

19 Sheets-Sheet 9

INVENTOR
GAROLD K. JENSEN

BY J. A. O'Connell
Richard C. Reed
ATTORNEYS

June 21, 1960 G. K. JENSEN 2,942,107

READ-OUT SYSTEM

Filed Nov. 29, 1957

19 Sheets-Sheet 10

INVENTOR
GAROLD K. JENSEN
BY J. A. O'Connell
Richard C. Reed
ATTORNEYS

June 21, 1960
G. K. JENSEN
2,942,107
READ-OUT SYSTEM
Filed Nov. 29, 1957
19 Sheets-Sheet 11

INVENTOR
GAROLD K. JENSEN
BY J. A. O'Donnell
Richard C. Reed
ATTORNEYS

INVENTOR
GAROLD K. JENSEN
BY J. A. O'Donnell
Richard C. Reed
ATTORNEYS

INVENTOR
GAROLD K. JENSEN

BY J. A. O'Connell
Richard C. Reed
ATTORNEYS

June 21, 1960 G. K. JENSEN 2,942,107

READ-OUT SYSTEM

Filed Nov. 29, 1957 19 Sheets-Sheet 14

INVENTOR
GAROLD K. JENSEN

BY J. A. O'Donnell
Richard C. Reed
ATTORNEYS

INVENTOR
GAROLD K. JENSEN

BY J. A. O'Connell
Richard C. Reed
ATTORNEYS

June 21, 1960 G. K. JENSEN 2,942,107

READ-OUT SYSTEM

Filed Nov. 29, 1957 19 Sheets-Sheet 16

INVENTOR
GAROLD K. JENSEN

BY J. G. O'Donnell
Richard C. Reed
ATTORNEYS

INVENTOR
GAROLD K. JENSEN
BY J. A. O'Connell
Richard C. Reed
ATTORNEYS

INVENTOR
GAROLD K. JENSEN
BY J. A. O'Connell
Richard C. Reed
ATTORNEYS

INVENTOR
GAROLD K. JENSEN
BY J. A. O'Connell
Richard C. Reed
ATTORNEYS

United States Patent Office 2,942,107
Patented June 21, 1960

2,942,107

READ-OUT SYSTEM

Garold K. Jensen, Fairfax County, Va., assignor to the United States of America as represented by the Secretary of the Navy Filed Nov. 29, 1957, Ser. No. 699,870

22 Claims. (Cl. 250—27)

(Granted under Title 35, U.S. Code (1952), sec. 266)

The invention described herein may be manufactured and used by or for the Government of the United States of America for governmental purposes without the payment of any royalties thereon or therefor.

This invention relates in general to an arrangement in which undesirable signals in an electrical circuit are attenuated and in particular to an improved read-out system in which undesired signals are substantially suppressed and desired signals are amplified.

In the field of electronics, there are many applications in which it is necessary to suppress undesired signals. For example, in storage tube circuits requiring rapid switching from read to write and vice versa, switching signals applied to a barrier grid storage tube may cause undesirable transients in the output circuit and unbalance of the electron tubes in a voltage regulator connected to the storage tube may generate objectionable square wave signals. In addition, due to the characteristics of a storage tube, there may be shading of the signal read-out of the storage tube, i.e., the desired signal may be superimposed on an undesired signal. The transients, square wave signals and the signals causing shading are objectionable in many systems in which the storage tube circuit may find useful application.

Accordingly, it is an object of the present invention to provide an arrangement in which signals causing shading, undesirable square wave signals and objectionable transients are substantially suppressed.

Another object of the present invention is to provide an arrangement in which a plurality of gated clamps are sequentially controlled to substantially suppress undesired transients.

Another object of the present invention is to provide an arrangement in which feedback is employed to substantially eliminate unbalance of electron tubes in a voltage regulator for a storage tube circuit.

Another object of the present invention is to provide an arrangement in which a plurality of gated clamps are simultaneously controlled to substantially suppress a plurality of series of damped oscillations.

Another object of the present invention is to provide an improved read-out system for a storage tube in which undesired square wave signals, objectionable transients and signals causing shading are substantially removed from the output of the storage tube circuit.

Other objects and many of the attendant advantages of this invention will be readily appreciated as the same becomes better understood when considered in connection with the accompanying drawing in which like reference numerals designate like parts throughout thereof and wherein:

Fig. 6 is a second set of waveforms at selected points in the first embodiment of the present invention disclosed in Fig. 1.

Figure 8:
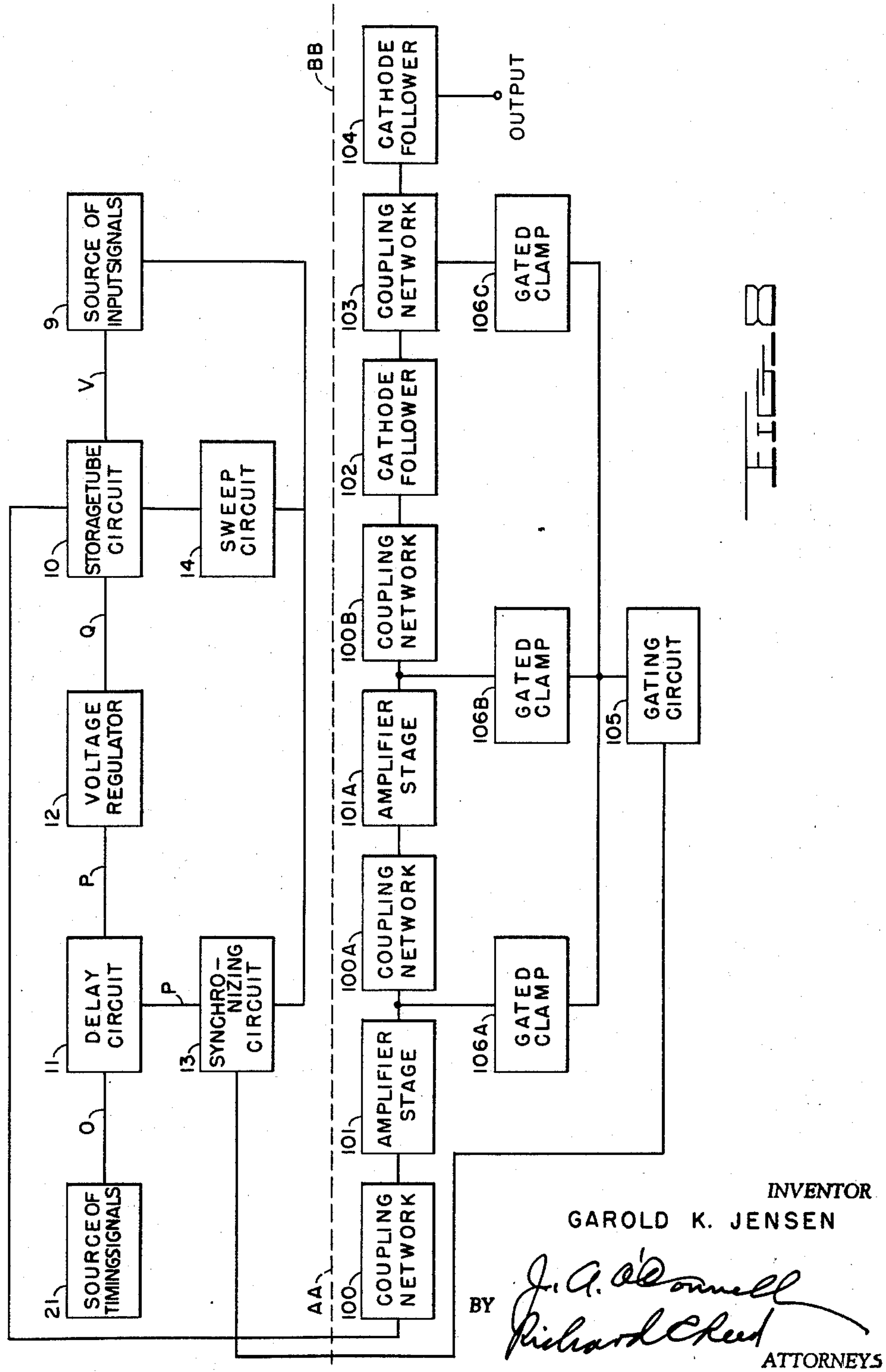
Fig. 8 is a third embodiment of the present invention.
Figure 9A:
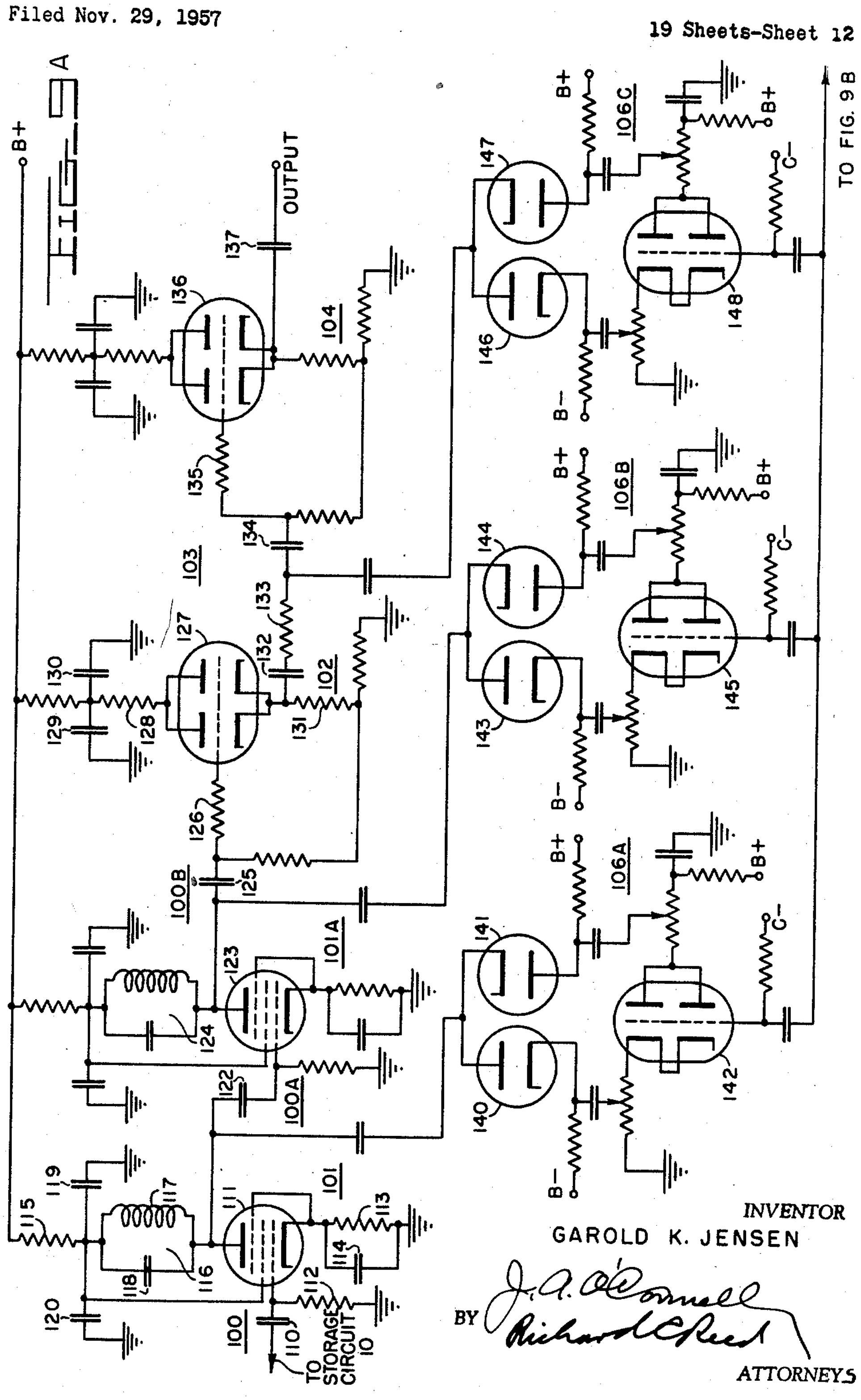
Figure 9B:
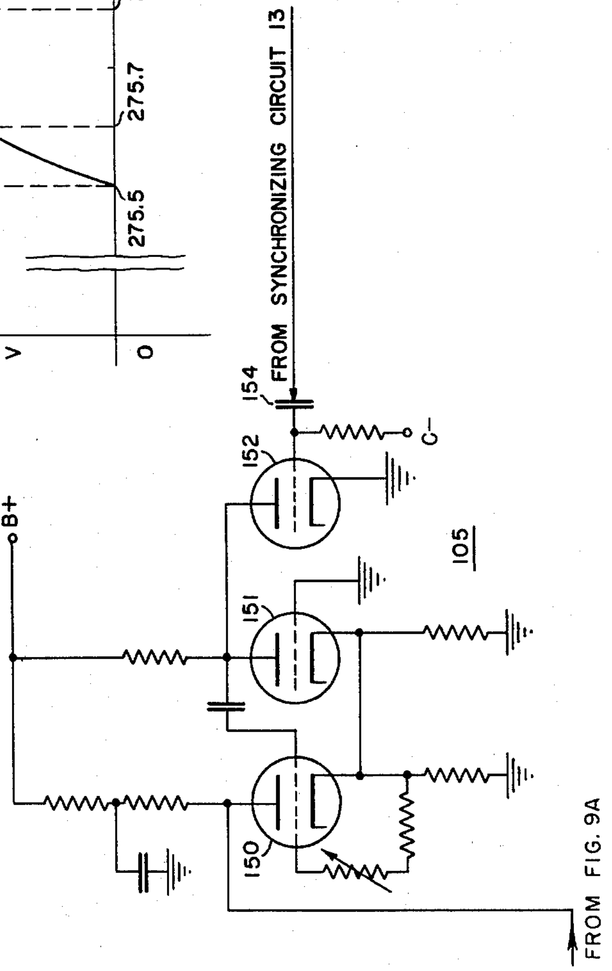

Figs. 9A and 9B, considered together, represent the detailed structure shown as hollow rectangles below the dotted line AA—BB in the third embodiment disclosed in Fig. 8.

Figure 10A:
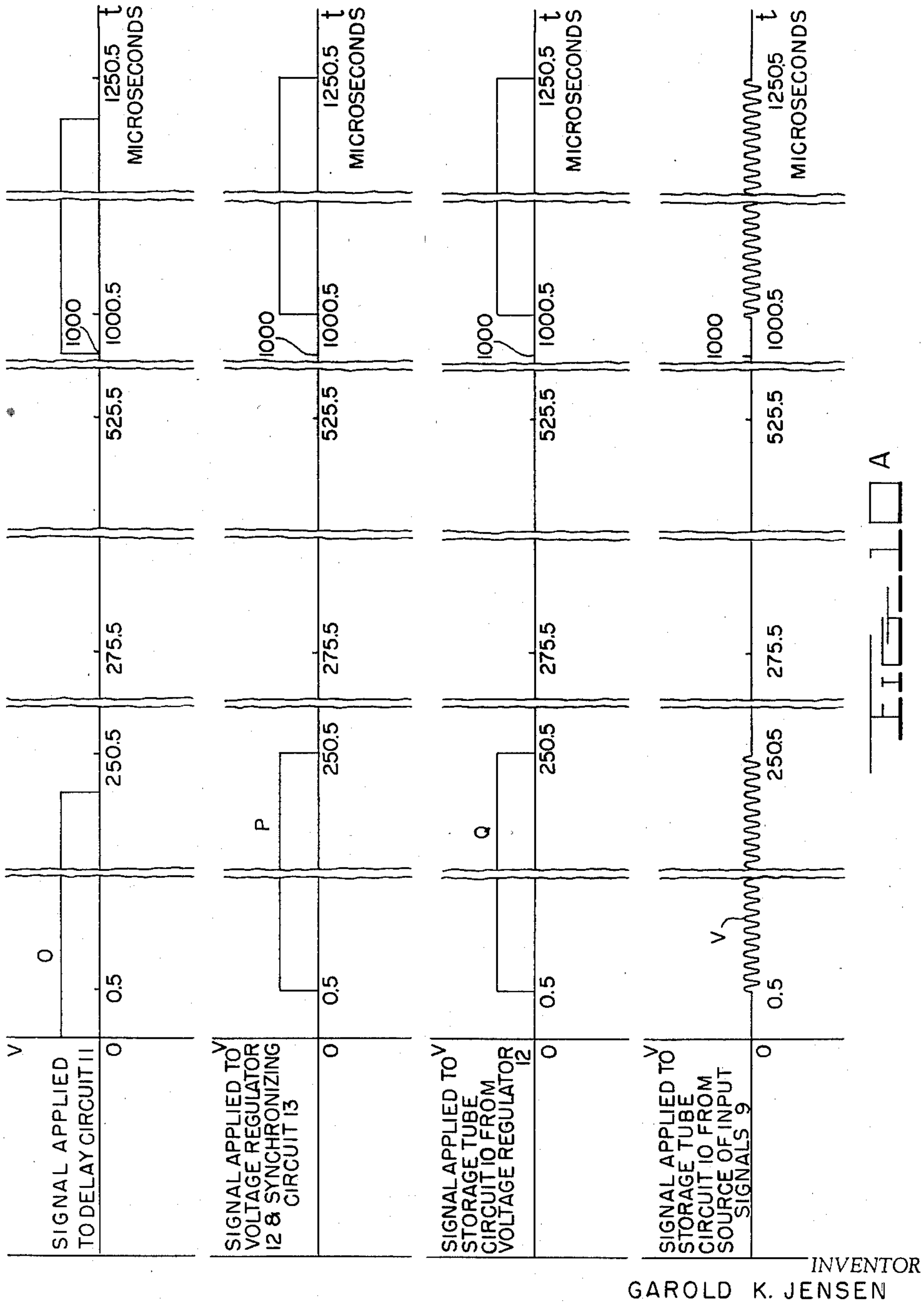
Figure 10B:
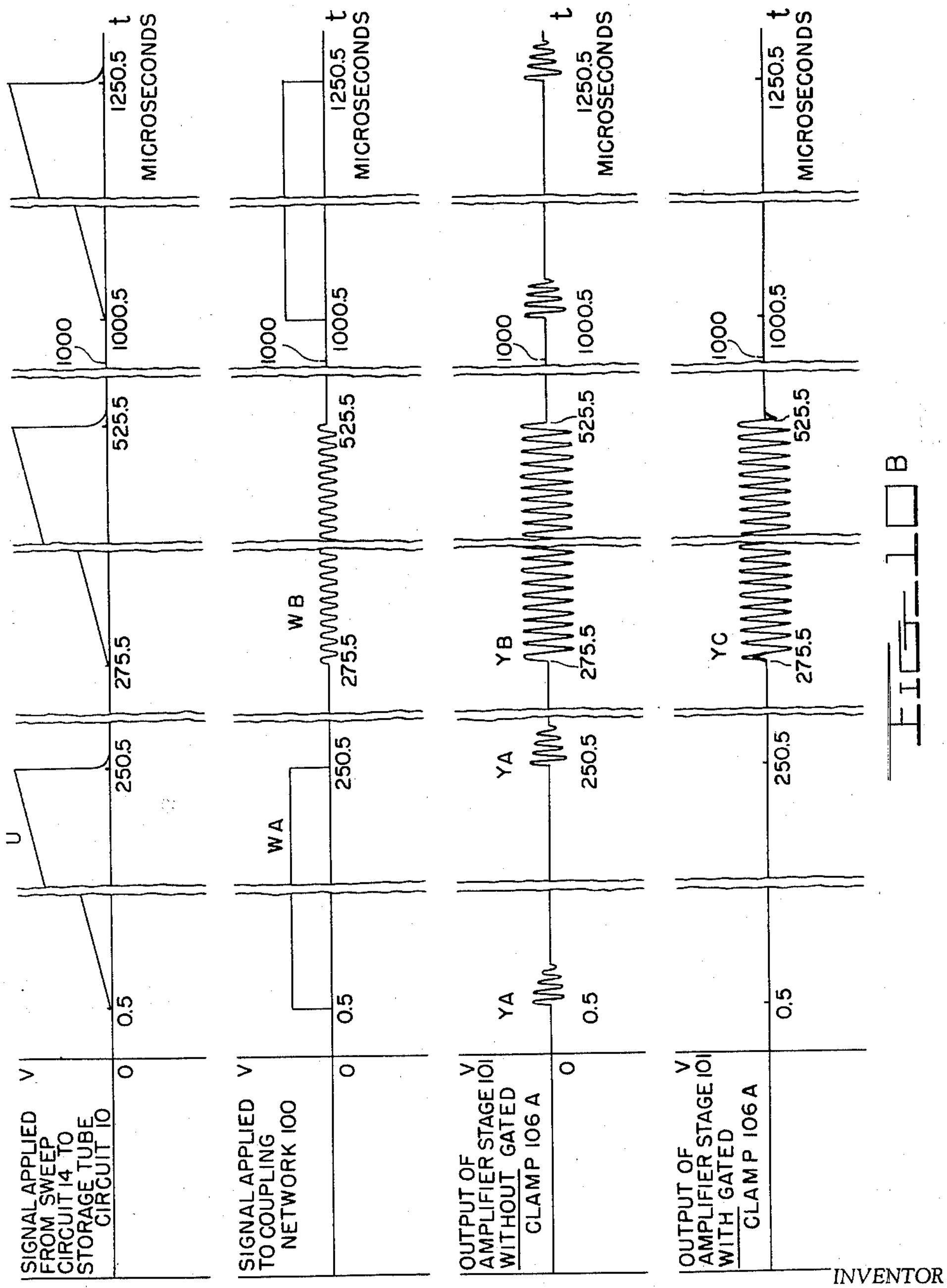
Figure 10C:
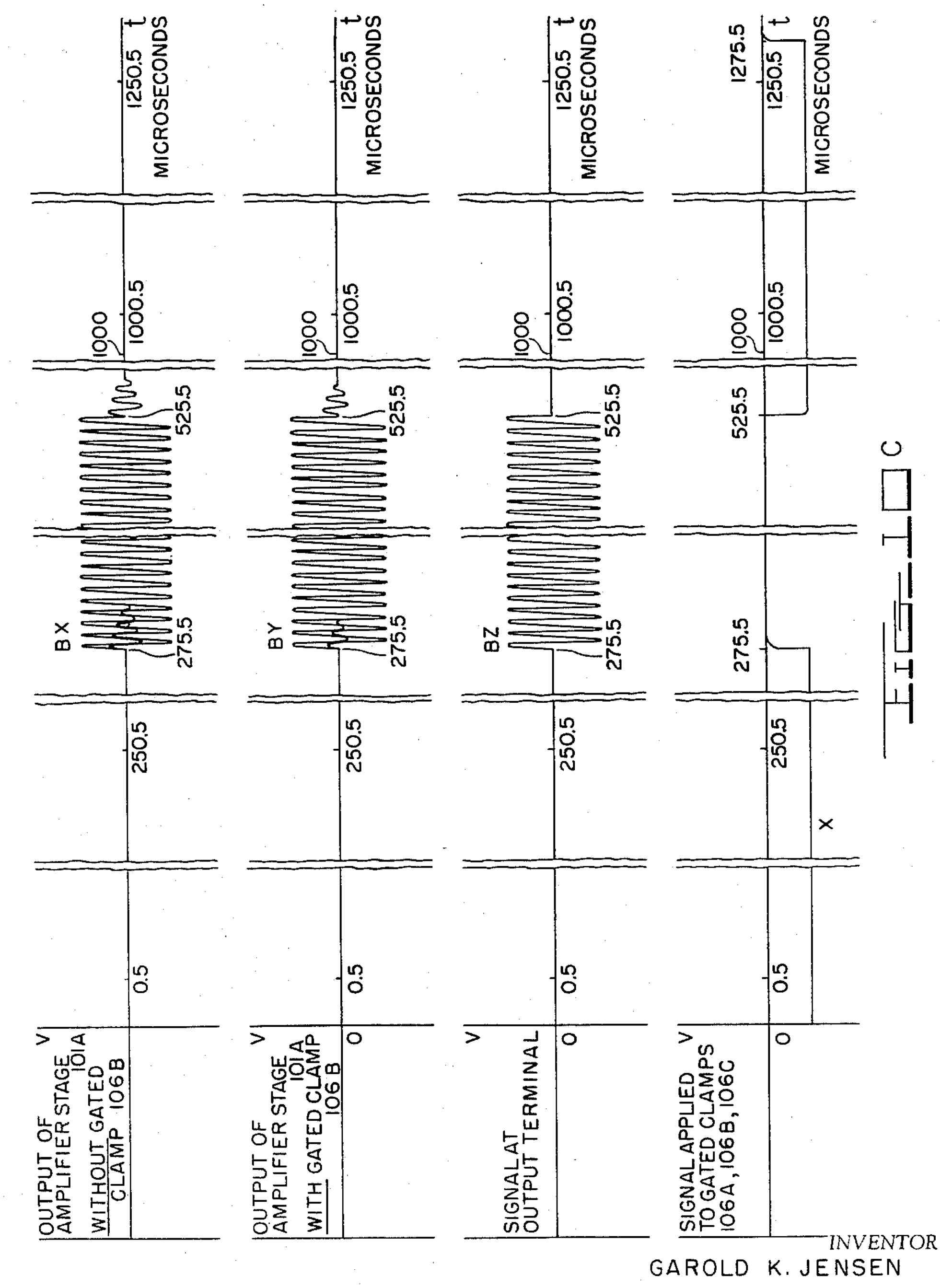

Figs. 10A to 10C are a set of waveforms of signals at selected points in the third embodiment of the present invention disclosed in Fig. 8.

Figure 11:
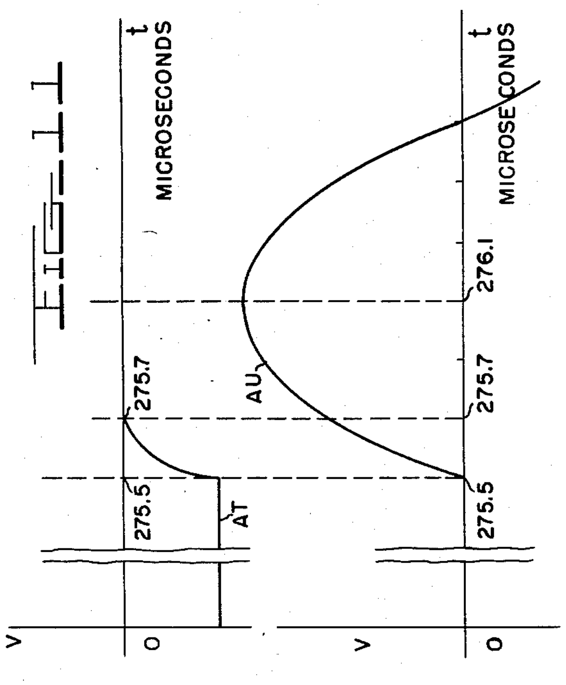

Fig. 11 is a detail of selected portions of particular signals shown in Figs. 10B and 10C.

Figure 12:
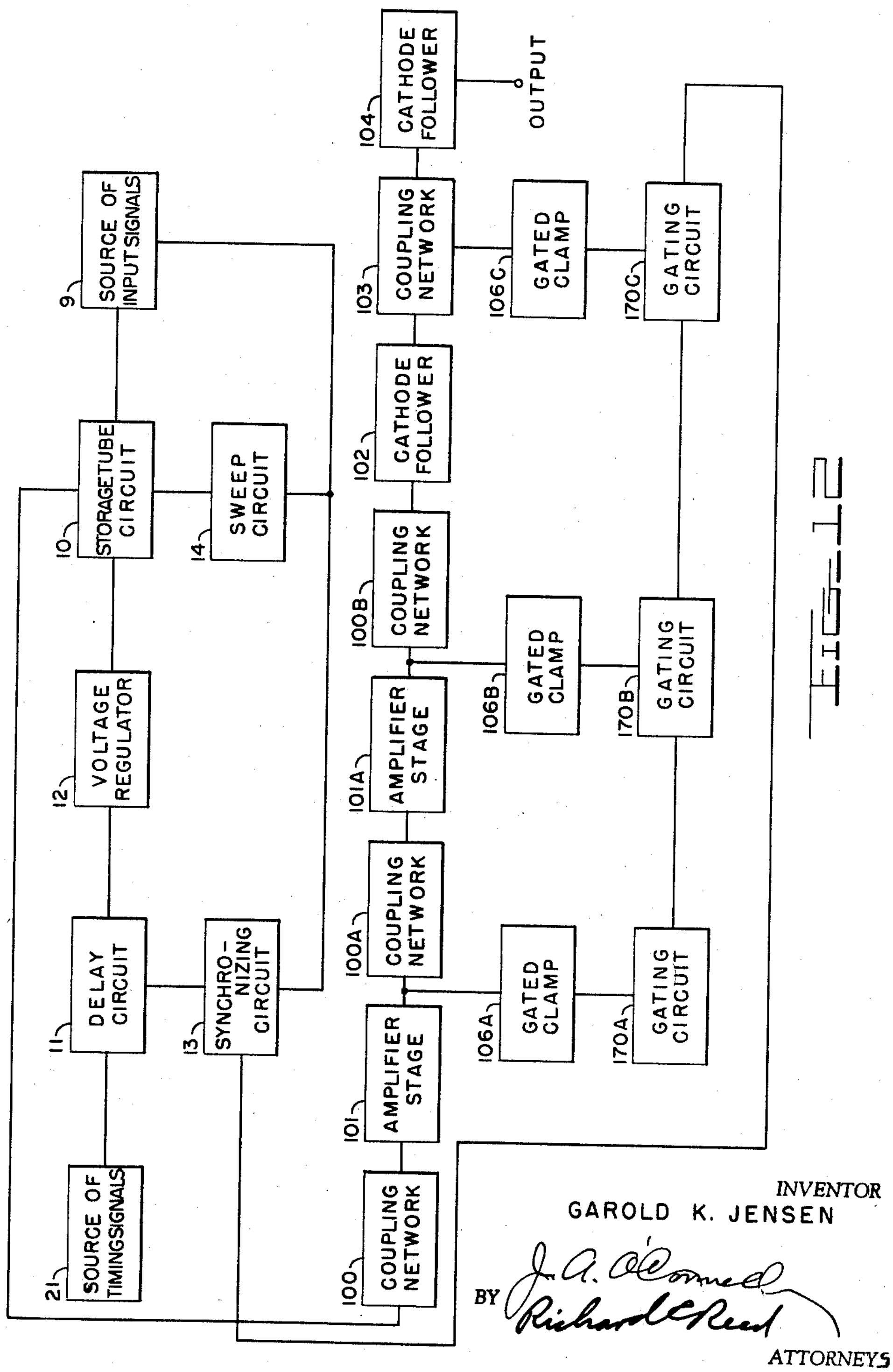

Fig. 12 is a fourth embodiment of the present invention.

Figure 13A:
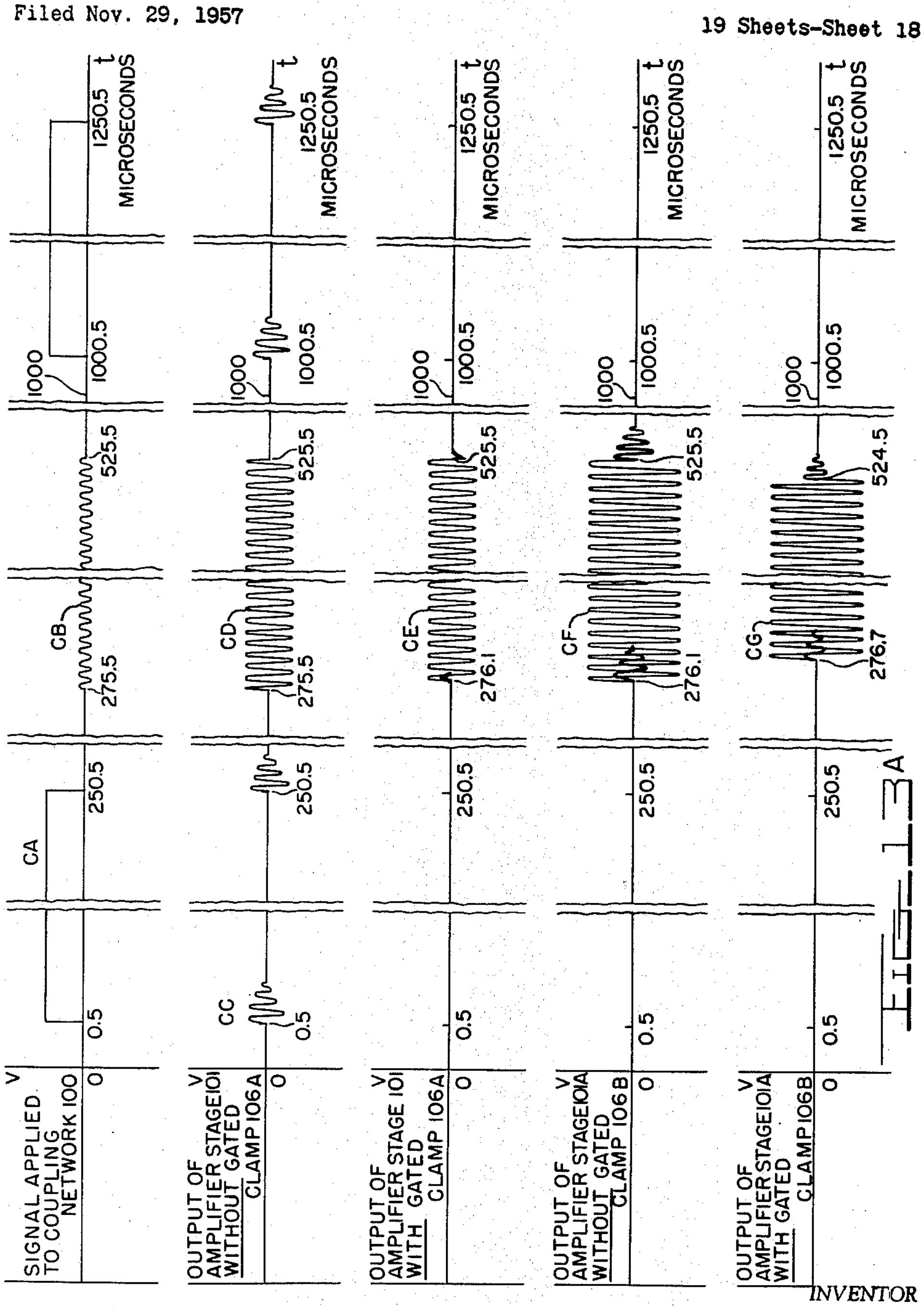
Figure 13B:
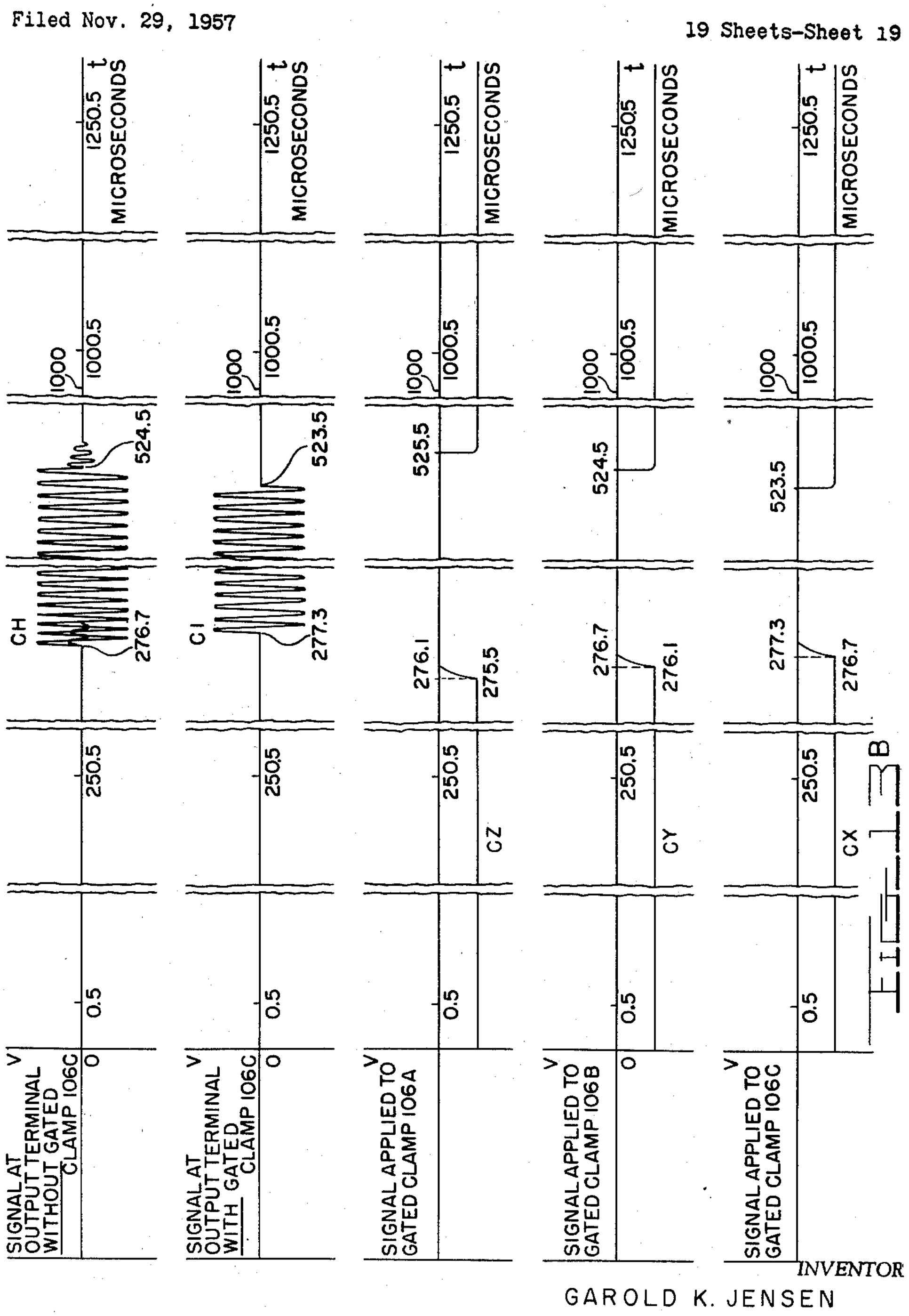

Figs. 13A and 13B are a set of waveforms of signals at selected points in the fourth embodiment of the present invention disclosed in Fig. 12.

In accordance with the present invention, undesired, recurrent signals are removed from the output of an electrical circuit by applying the output to an arrangement that includes a plurality of amplifier stages. Each of a plurality of gated clamps is connected to a respective one of the amplifier stages and is operated in the predetermined time intervals in which the undesired signals occur to attenuate and substantially remove the undesired signals from the output of the electrical circuit.

In applying the fundamental teachings of the present invention in one embodiment, undesired signals, e.g., signals causing shading, square wave signals, and objectionable transients are substantially removed from the output of a storage tube circuit by applying the output to an arrangement that includes a plurality of amplifier stages. Each of a plurality of gated clamps is connected to a respective one of the amplifier stages and is operated in predetermined time intervals to substantially suppress undesirable transients, and a high pass filter is connected to a selected one of the amplifier stages to suppress the signals causing shading. In addition, a gated clamp is connected to the high pass filter to suppress ringing introduced by the filter and a feedback circuit is connected between a selected one of the plurality of amplifier stages and a voltage regulator that controls the potential applied to a storage tube in the storage tube circuit to balance the electron tubes in the voltage regulator so that the square wave signals are substantially removed from the output of the storage tube circuit.

In another embodiment of the present invention, objectionable signals, e.g., square wave signals and signals causing shading, are removed from the output of a storage tube circuit that includes a desired sine wave signal by applying the output of the storage tube circuit to an arrangement employing a plurality of amplifier stages. Each of a plurality of gated clamps is connected to a respective one of the amplifier stages, which includes an electron tube connected to a tuned circuit. The plurality of gated clamps are controlled simultaneously in predetermined time intervals to substantially suppress the series of damped oscillations generated by the application of the leading and trailing edges of the square wave signals and the spikes generated by preceding gated clamps to the electron tubes and their corresponding tuned circuits. Since the tuned circuits offer a relatively low impedance to the signals causing shading, the signals are not amplified in the amplifier stages and are substantially suppressed. Thus, the signals causing shading, undesired square wave signals and the objectionable series of damped oscillations are attenuated and substantially removed from the output of the arrangement providing the desired sine wave signals.

Figure 1:
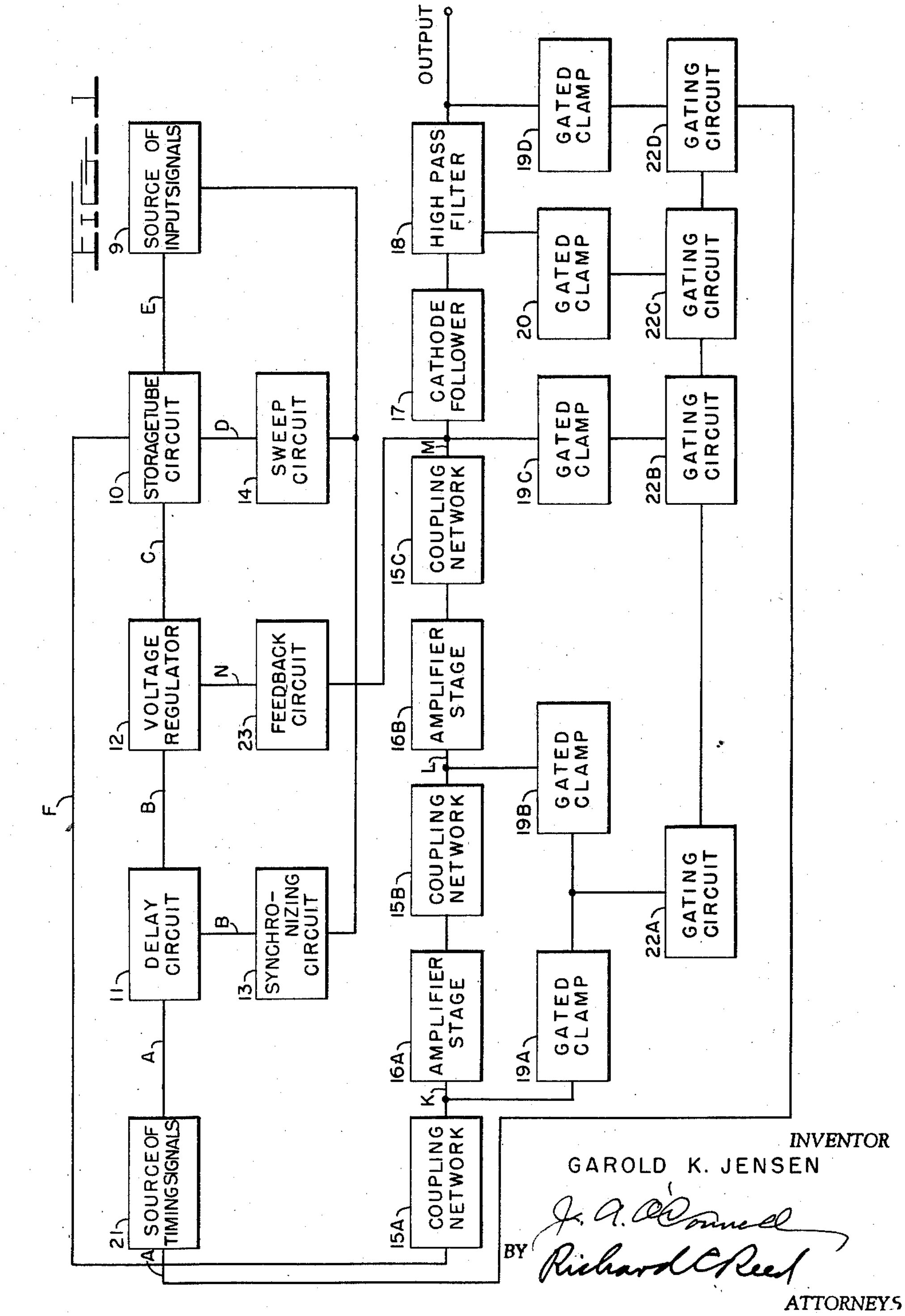
Fig. 1 is a block diagram of a first embodiment of the present invention.
Figure 2:
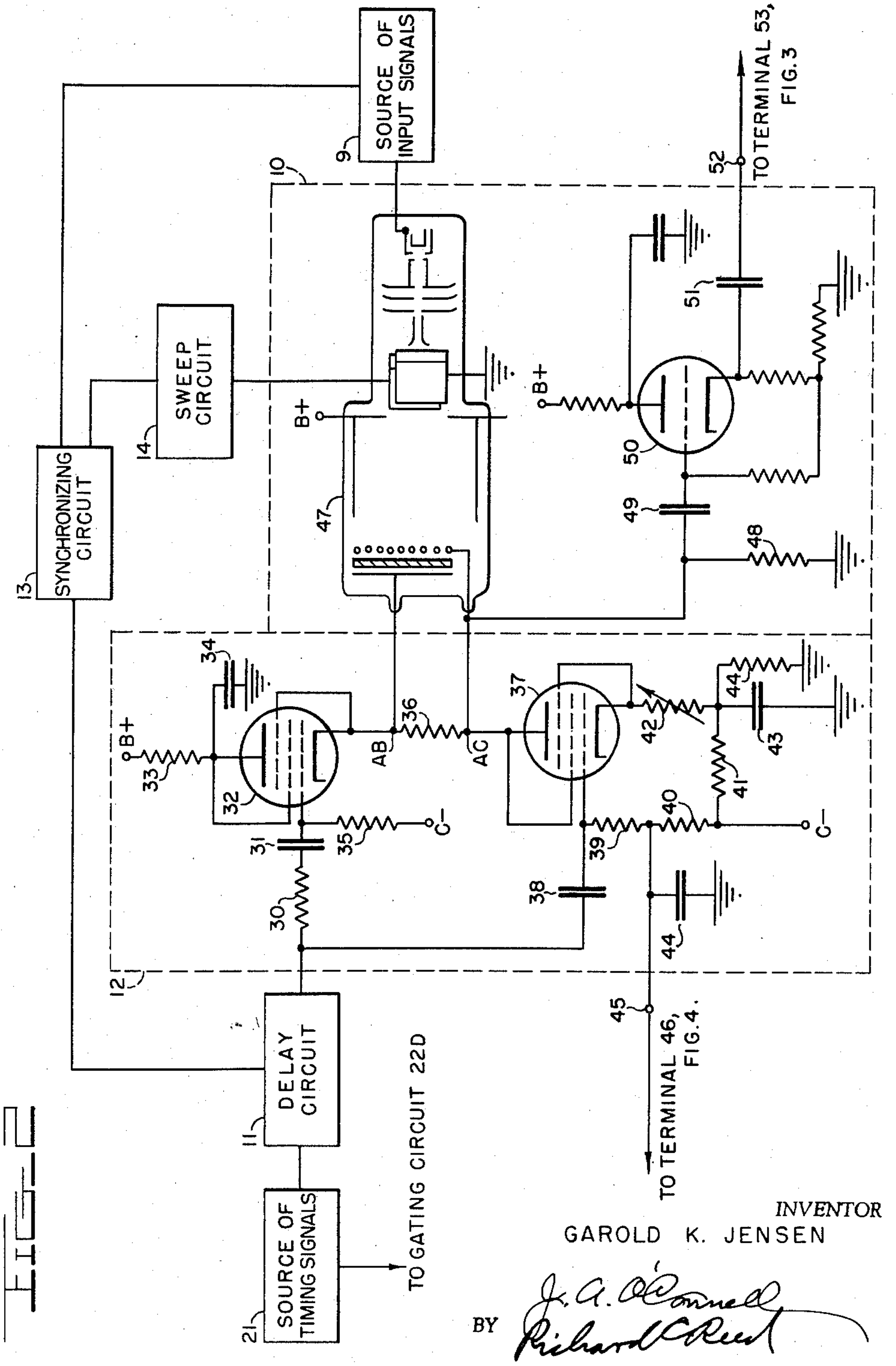
Fig. 2 is a detailed drawing of the voltage regulator and the storage tube circuit represented as hollow rectangles in Fig. 1.

Referring to Fig. 1, a source of input signals 9 is connected to storage tube circuit 10 and source of timing signals 21 is connected through delay circuit 11 and voltage regulator 12 to storage tube circuit 10. Synchronizing circuit 13 is connected to sweep circuit 14, source of input signals 9, and delay circuit 11. The source of input signals 9 may be any source of signals that provides an appropriate intelligence signal, for example, 1.8 mc. bursts having 10 microseconds' duration and a repetition rate of 1000 pulses per second. The source of timing signals 21 may be any source of signals that provides a desired timing signal, e.g., square wave signals having a duration of 10 microseconds and a repetition rate of 1000 pulses per second. Delay circuit 11 may be any conventional circuit that will delay the timing signal a predetermined length of time. For example, in the present embodiment the timing signals are delayed 0.5 microsecond. The sweep circuit 14 may be a conventional circuit that will provide storage tube 47 in storage tube circuit 10, as shown in Fig. 2, with a first sweep having a duration of10 microseconds, hereinafter called the write sweep, and a second sweep having a duration of 960 microseconds, hereinafter called the read sweep. Synchronizing circuit 13 may be an appropriate circuit that will synchronize sweep circuit 14 and source of input signals 9 so that the intelligence signals from the source of input signals 9 are applied to storage tube 47 during the write sweep. The output of storage tube circuit 10 is applied to amplifier stage 16A through coupling network 15A. Amplifier stage 16A is connected through coupling network 15B to amplifier stage 16B which in turn is connected to cathode follower 17 through coupling network 15C. A high pass filter 18 is connected between cathode follower 17 and the output terminal. High pass filter 18 may be of a conventional design, e.g., a terminated T section, constant K high pass filter, having a 17 kc. cut off, is employed in the first embodiment of the present invention. The 17 kc. cut off frequency was selected for the reason that the 18 mc. burst stored on the target dielectric of storage tube 47 during the 10 microseconds write sweep and read-out during the 960 microseconds read sweep is divided down to approximately 18 kc.; and it is desired to suppress the signals causing shading and their harmonics which have frequencies below 17 kc. Each of gated clamps 19A to 19D and 20 have a closed condition during which the gated clamp conducts and an open condition during which the gated clamp does not conduct. Each of the gated clamps is connected to a respective one of the amplifier stages 16A and 16B, cathode follower 17, high pass filter 18, and the output terminal. Source of timing signals 21 is connected to gating circuit 22D which in turn is connected in cascade with gating circuits 22A, 22B and 22C. The output of gating circuit 22A is connected to and controls gated clamps 19A and 19B, and in a similar manner gating circuits 22B to 22D control gated clamps 19C, 20 and 19D, respectively. Finally, feedback circuit 23 is connected between voltage regulator 12 and both cathode follower 17 and gated clamp 19C.

The details of the structure contained in the hollow rectangles in Fig. 1 will be presented before proceeding with an explanation of the operation of the embodiment of the present invention disclosed in this figure.

Referring to Fig. 2, signals from the source of timing signals 21 are applied through delay circuit 11, resistor 30, and capacitor 31 to the control grid of electron tube 32. The plate of electron tube 32 is connected to a source of B+ through resistor 33 and to ground through capacitor 34, the control grid is connected to a source of C— through resistor 35 and the cathode to the plate of electron tube 37 through resistor 36. The screen grid of electron tube 32 is connected to the plate and the suppressor grid to the cathode of electron tube 32. The control grid of electron tube 37 is connected through capacitor 38 to the output of delay circuit 11, to the cathode of electron tube 37 through resistors 39, 40, 41 and variable resistor 42, and to a source of C— through resistors 39 and 40. The cathode of electron tube 37 is connected to ground through variable resistor 42 and capacitor 43. Resistor 44 is connected across capacitor 43 to ground. The screen grid of electron tube 37 is connected to the plate and the suppressor grid is connected to the cathode of electron tube 37. The control grid of electron tube 37 in voltage regulator 12 is connected through resistor 39 and terminal 45 in Fig. 2 to terminal 46 in Fig. 4. One side of resistor 36 at point AB is connected to the plate and the other side of the resistor at point AC is connected to the screen of storage tube 47. The screen of storage tube 47 is connected through resistor 48 to ground and through capacitor 49 to the control grid of electron tube 50 which in turn is connected in a conventional cathode follower circuit. The cathode of electron tube 50 in storage tube circuit 10 is connected through capacitor 51 and terminal 52 in Fig. 2 and through terminal 53 and coupling network 15A, which consists of capacitor 56 and resistor 57, to the control grid of electron tube 55 in Fig. 3. Coupling networks 15B and 15C, shown in Fig. 1, are identical with coupling network 15A shown in detail in Fig 3.

Figure 3:
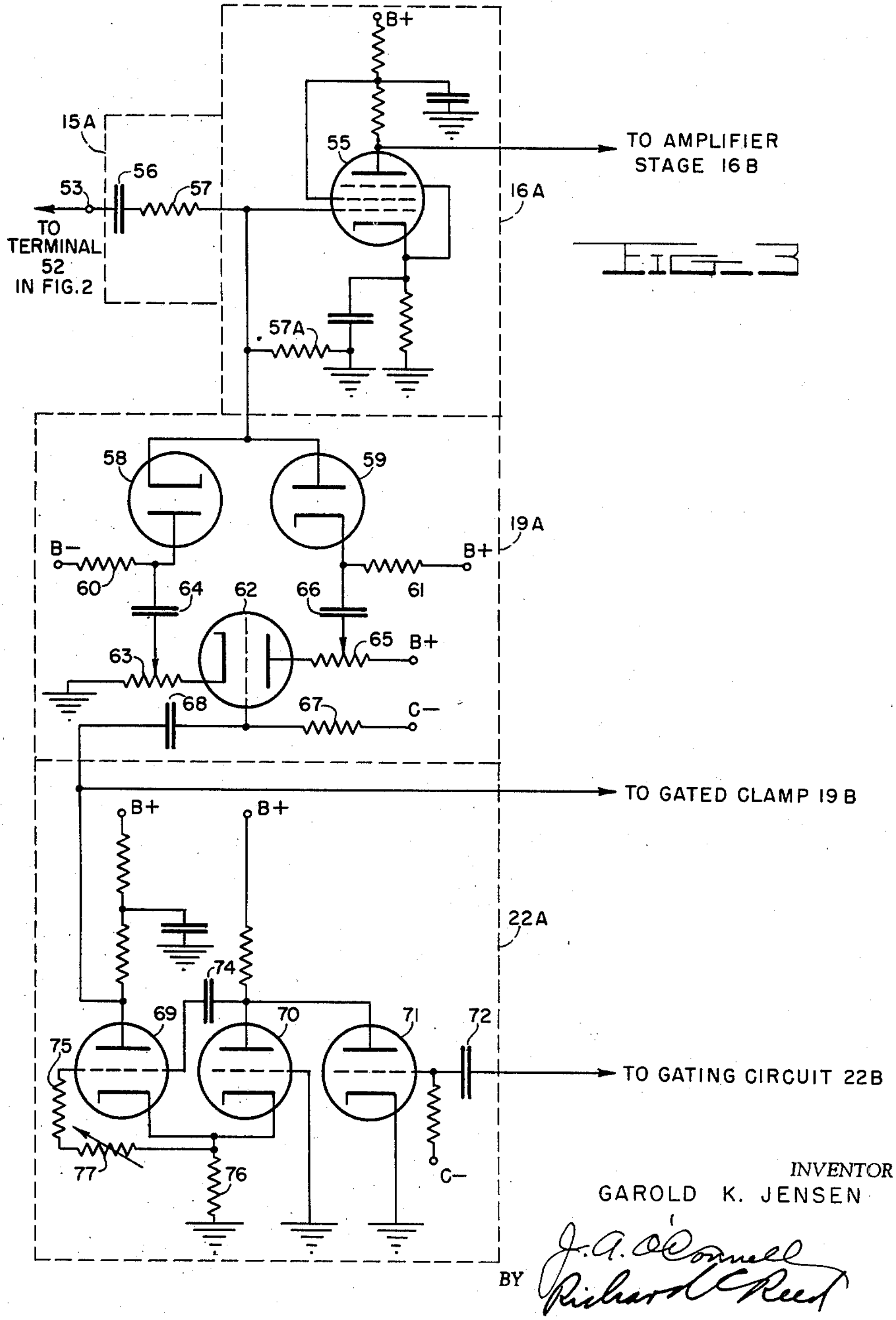
Fig. 3 is a detailed drawing of a coupling network, an amplifier stage, a gated clamp and a gating circuit, each of which are shown as hollow rectangles in Fig. 1.

Referring to Fig. 3, electron tube 55 in amplifier stage 16A is connected in a conventional amplifier circuit which is also employed in amplifier stage 16B. The plate of electron tube 55 is coupled through coupling network 15B to the control grid of the corresponding electron tube in amplifier stage 16B. The control grid of electron tube 55 is connected to the cathode of diode 58 and to the plate of diode 59 in gated clamp 19A. The plate of diode 58 is connected to a source of B— through resistor 60 and the cathode of diode 59 is connected to a source of B+ through resistor 61. Thus gated clamp 19A is normally biased in the open condition. The cathode of electron tube 62, which is employed in a phase inverter circuit, is connected to ground through variable resistor 63 and to the plate of diode 58 through variable resistor 63 and capacitor 64. The plate of electron tube 62 is connected to a source of B+ through variable resistor 65 and to the cathode of diode 59 through variable resistor 65 and capacitor 66. Diodes 58 and 59 may be 6AL5 electron tubes. Electron tubes 69 and 70 in gating circuit 22A are connected in a conventional one shot multivibrator circuit that is controlled by keying electron tube 71. Capacitor 72 couples the grid of electron tube 71 to the plate of the electron tube that corresponds to electron tube 69 in the preceding gating circuit 22B. The plate of electron tube 70 is coupled through capacitor 74 to the control grid of electron tube 69 which is connected to ground through resistors 75 and 76 and variable resistor 77. The plate of electron tube 69 is coupled to the control grid of electron tube 62 through capacitor 68 and through appropriate and similar coupling means to the control grid of the electron tube corresponding to electron tube 62 in the gated clamp 19B.

Referring to Fig. 3 in the operation of the arrangement disclosed therein, when a control signal is applied to the control grid of electron tube 71, which is normally cut off, the electron tube is driven into conduction and a negative pulse is applied through capacitor 74 to the control grid of electron tube 69. Since electron tube 69, normally conducting, is cut off by the negative pulse, a positive pulse is applied to the grid of electron tube 62 through capacitor 68 driving electron tube 62, which is normally cut off, into conduction. Consequently, a negative pulse is applied through capacitor 66 to the cathode of diode 59 and a positive pulse is applied through capacitor 64 to the plate of diode 58. Thus, gated clamp 19A is placed in the closed condition and offers a low impedance path from the control grid of electron tube 55 to ground. Likewise, gated clamp 19B is placed in the closed condition simultaneously with gated clamp 19A. In the present embodiment, the impedance of the low impedance path will be approximately 1000 ohms. When the negative pulse leaks off capacitor 74 through the control grid of electron tube 69, resistors 75 and 76 and variable resistor 77 to ground, electron tube 69 conducts. A negative pulse is then applied to the control grid of electron tube 62, cutting the electron tube off, and placing gated clamp 19A in the open condition. At the same instant, gated clamp 19B is placed in the open condition. The time interval during which gated clamp 19A is in the closed condition is determined by the values of capacitor 74, resistors 75 and 76, and variable resistor 77. As indicated below in connection with Figs. 5A to 5D, in the embodiment of the present invention disclosed in Fig. 1, gating circuits 22A to 22D are set to control gated clamps 19A to 19D and 20 so that gated clamps 19A and 19B are closed simultaneously 0.1 microsecond after gated clamp 19C and are simultaneously opened 1 microsecond before gated clamp 19C. Similarly, gated clamp 20 is placed in the closed condition 0.1 microsecond before gated clamp 19C and 0.1 microsecond after gated clamp 19D and is placed in the open condition 1 microsecond after gated clamp 19C and 1 microsecond before gated clamp 19D.

Gated clamps 19B, 19C and 19D, shown as hollow rectangles in Fig. 1, are identical in structure to gated clamp 19A disclosed in detail in Fig. 3; and gating circuits 22B, 22C, and 22D are identical to gating circuit 22A shown in the latter figure. Gated clamp 20, shown as a hollow rectangle in Fig. 1, is similar to gated clamp 19A. However, in gated clamp 20, 1N34 silicon diodes, instead of 6AL5 electron tubes, are used with appropriate bias, resistors, and capacitors so that, when closed, gated clamp 20 will have a lower impedance path to ground than gated clamp 19A. For example, the impedance of the path from the control grid of electron tube 55 through gated clamp 19A to ground is approximately 1000 ohms and the impedance of the path from high pass filter 18 through gated clamp 20 to ground is approximately 400 ohms.

Figure 4:
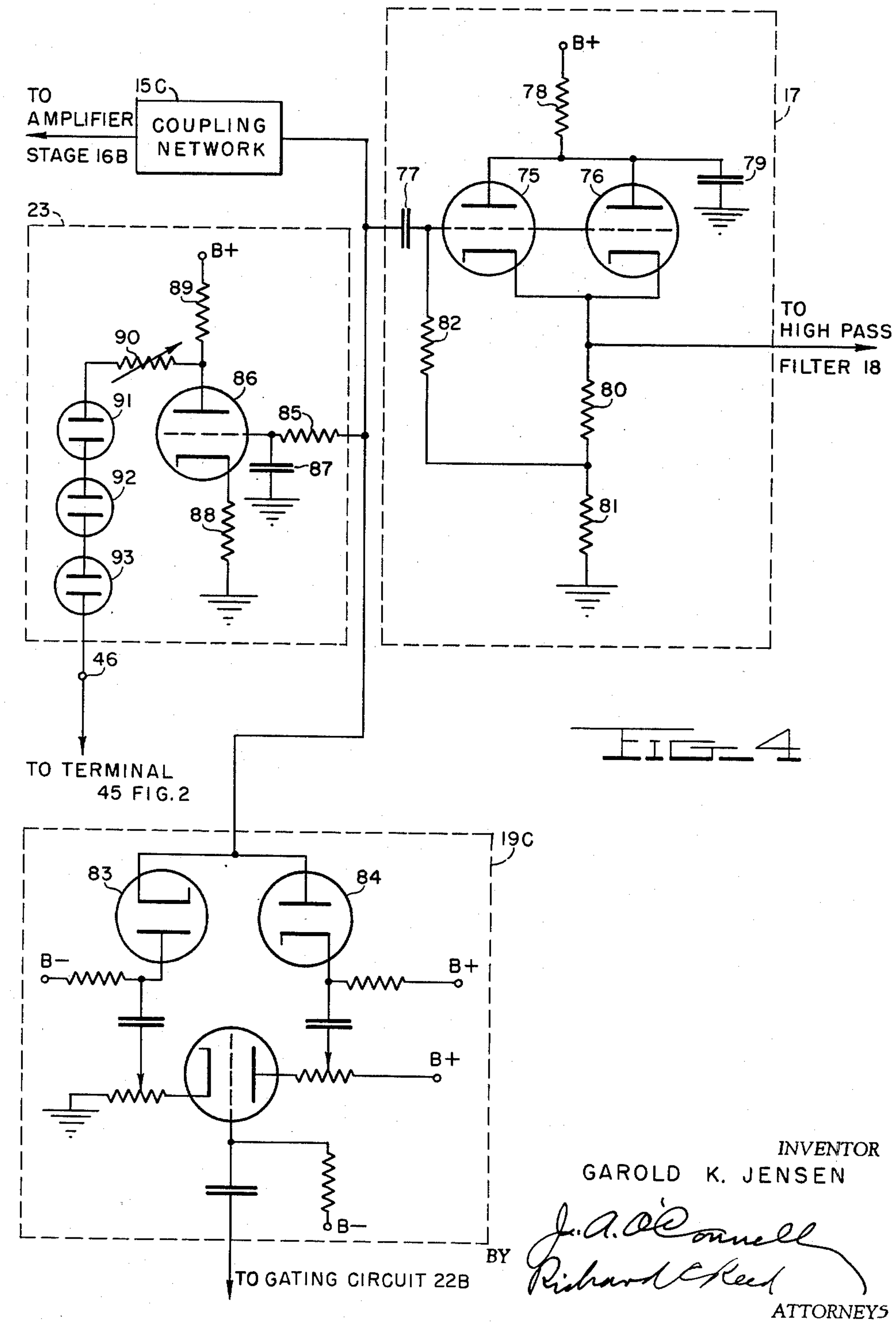
Fig. 4 is a detailed drawing of the cathode follower, the feedback circuit, and a gated clamp shown as hollow rectangles in Fig. 1.

Referring to Fig. 4, the output of amplifier stage 16B is coupled to the grids of electron tubes 75 and 76 through coupling network 15C and capacitor 77. The plates of electron tubes 75 and 76 are connected together and to a source of B+ through resistor 78; the cathodes are connected together and to ground through resistors 80 and 81; and the control grids are connected together and to ground through resistors 81 and 82. The cathodes of electron tubes 75 and 76 are connected to high pass filter 18. The control grids of these electron tubes are coupled through capacitor 77 to the cathode of diode 83 and to the plate of diode 84 in gated clamp 19C and through capacitor 77 and resistor 85 to the control grid of electron tube 86 in feedback circuit 23. The control grid of electron tube 86 is coupled to ground through capacitor 87, the plate is connected to a source of B+ through resistor 89 and the cathode to ground through resistor 88. The plate of electron tube 86 is connected through variable resistor 90, neon tubes 91 and 93 and terminal 46 in Fig. 4 to terminal 45 and through resistor 39 to the control grid of electron tube 37 in voltage regulator 12 in Fig. 2. The number and type of neon tubes employed in feedback circuit 23 are selected so that the potential difference between the plate of electron tube 86 and the control grid of electron tube 37 is maintained at a predetermined fixed difference of potential so that any signal appearing at the plate of electron tube 86 will control electron tube 37 with only slight attenuation. For example, if it is desired to maintain the plate of electron tube 86 at +105 volts and the control grid of electron tube 37 at −175 volts, four NE–2 neon tubes operating at 70 volts should be employed.

Referring to the block diagram in Fig. 1, the details of the storage tube circuit 10 and the voltage regulator in Fig. 2, and the waveforms of the signals in Figs. 5A to 5D, signal A is applied to delay circuit 11 from the source of timing signals 21. Signal A, a square wave signal having a duration of 10 microseconds and a repetition rate of 1000 pulses per second, is delayed 0.5 microsecond by delay circuit 11 to provide signal B which is applied to the control grids of electron tubes 32 and 37 in storage tube circuit 10. It is understood, of course, that signal A may be delayed any desired length of time.

Referring to Fig. 2, the potential at point AB is zero when electron tubes 32 and 37 are in their normal cut off condition. When signal B is applied to the control grids of these electron tubes, driving the electron tubes into conduction, signal C, having a magnitude of 50 volts, is developed at point AB and is applied to the plate of storage tube 47. When electron tubes 32 and 37 are in their normal cut off condition, the potential at point AC and the screen of storage tube 47 is zero. If the electron tubes are balanced, when driven into conduction, since the current through electron tube 32 will increase the potential at point AC and the current through electron tube 37 will decrease the potential at point AC, the potential at this point and the screen of the storage tube will continue to have zero magnitude. Since electron tubes 32 and 37, when connected in the arrangement disclosed in Fig. 2, will not ordinarily be balanced, feedback circuit 23 is connected in the arrangement shown in Fig. 1 to maintain the electron tubes substantially balanced, as explained in detail below in connection with Figs. 4 and 6.

When the leading and trailing edges of signal B are applied to the control grids of electron tubes 32 and 37, transients, occurring at 0.5 microsecond and 10.5 microseconds, hereinafter called first signals, are developed across resistor 48 and are applied to amplifier stage 16A through coupling network 15A.

Figure 5A:
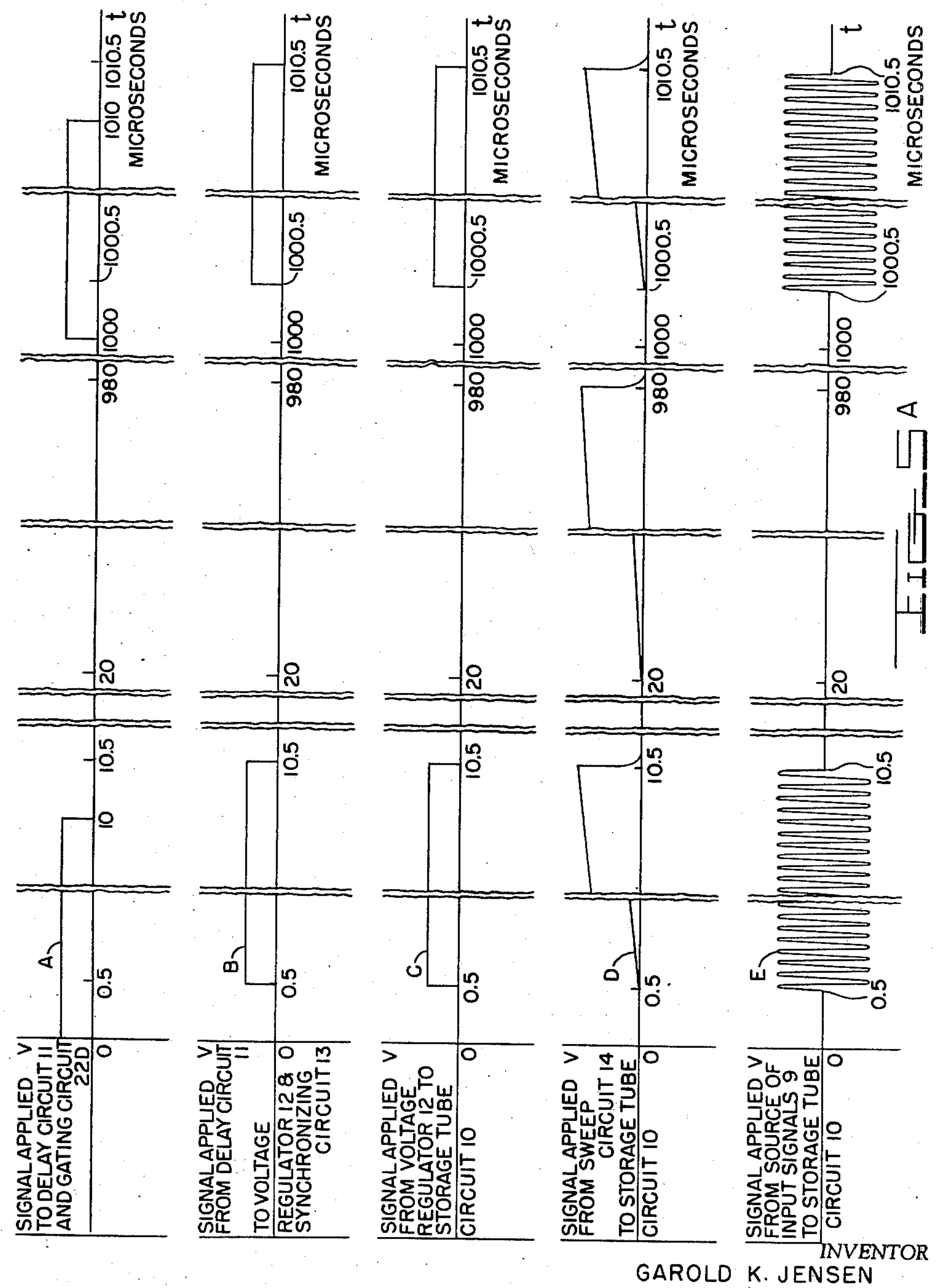
Figs. 5A to 5D are a first set of waveforms at selected points in the first embodiment of the present invention disclosed in Fig. 1.

Referring to Figs. 1 and 5A, signal B is applied to synchronizing circuit 13 which provides an output signal to synchronize sweep circuit 14 and source of input signals 9 so that signal E is applied during the write sweep to the cathode of storage tube 47 in storage tube circuit 10 to intensity modulate the cathode beam of the storage tube. During the same time interval, signal B is applied to the control grids of electron tubes 32 and 37 to drive the electron tubes into conduction so that signal C having a magnitude of 50 volts is applied to the plate while the screen of storage tube 47 is maintained at zero potential. Consequently, electrical charges whose magnitudes are representative of signal E are stored on discrete areas of the target dielectric of storage tube 47.

During the read sweep, signal B is not applied to the control grids of electron tubes 32 and 37. The electron tubes are cut off and the potential at point AB and the plate of storage tube 47 is zero. Since the plate of the storage tube is lowered from 50 volts, the potential at which it is maintained during the write sweep, to zero volts, the potential of the plate during the read sweep, the electrical charges stored on the target dielectric of storage tube 47 during the write sweep are lowered 50 volts and are in the negative range during the read sweep. Hence, since the screen of the storage tube, which is connected to point AC, is zero during the read sweep, the charges knocked off the target dielectric by the cathode beam are attracted by the screen of storage tube 47. Some of the electrical charges are collected by the screen but the majority of the electrical charges flow to the collector of storage tube 47 and from the collector through B+, ground, and resistor 48 to the plate of the storage tube. Thus, a signal, hereinafter called the second signal, is developed across resistor 48 during each read sweep in dependency on the electrical charges stored on the target dielectric of storage tube 47. Because of the inherent characteristics of storage tube 47, the second signal includes a component which causes distortion and prevents the second signal from being an accurate representation of signal E, i.e., the intelligence signal applied from the source of input signals 9 to the cathode of storage tube 47. The first signals and the second signals, the latter shown by waveform F in Fig. 5C, are alternately and repetitively applied from storage tube circuit 10 to amplifier stage 16A through coupling network 15A in Fig. 1.

Figure 5B:
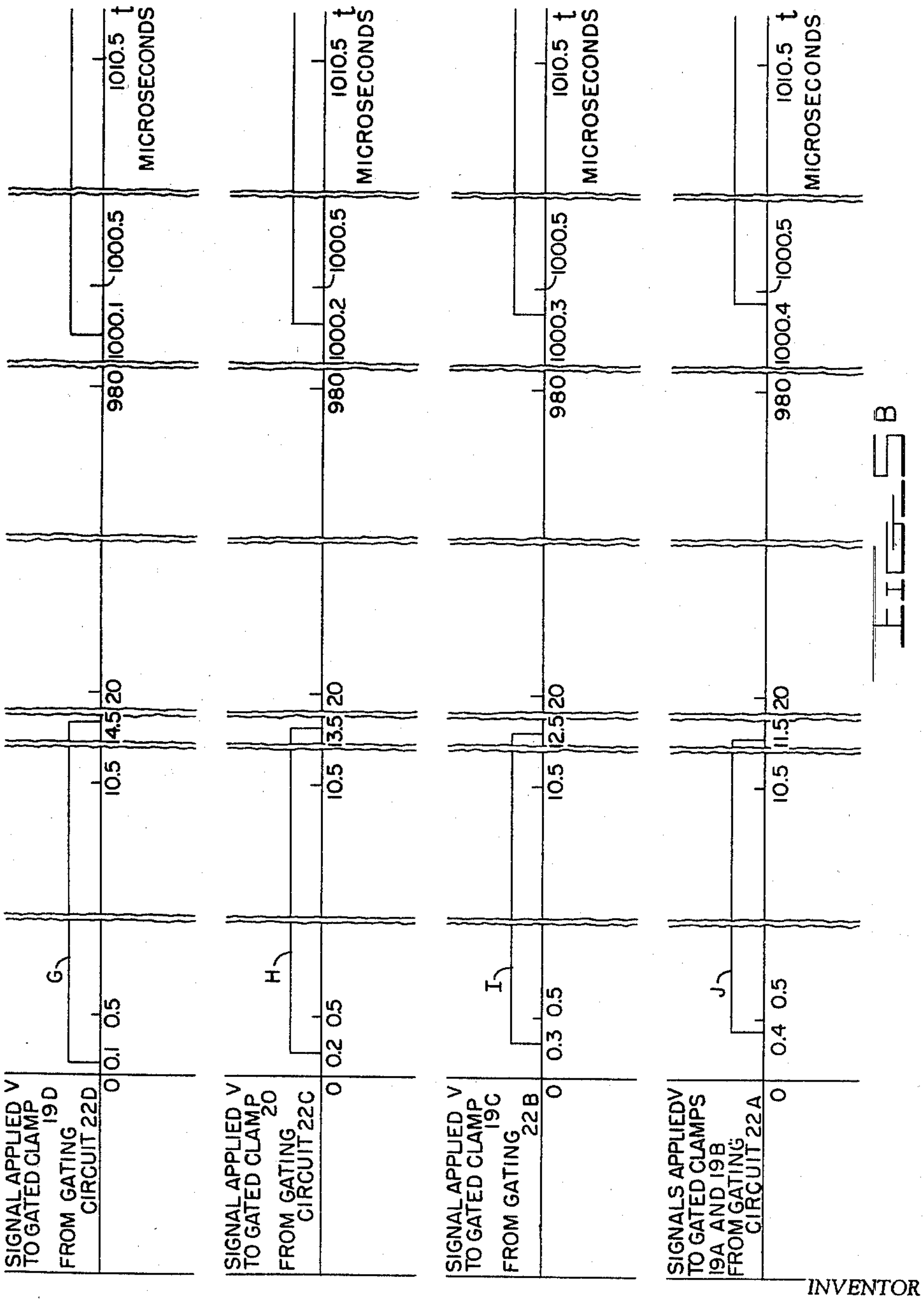

In order to illustrate the operation of the first embodiment of the present invention shown in Fig. 1, the cycle of operation during the time interval between 0 and 980 microseconds will be considered in detail. As shown in Fig. 1, signal A is applied from source of timing signals 21 to gating circuit 22D to control gated clamp 19D in the same manner, indicated above in connection with Fig. 2, that gating circuit 22A controls gated clamp 19A. Accordingly, signal G is applied from gating circuit 22D to gated clamp 19D to place the gated clamp in the closed condition during the time interval between 0.1 and 14.5 microseconds, as shown in Fig. 5B. Gating circuit 22D provides a signal that is applied to and controls gating circuit 22C. Gating circuit 22C generates signal H which is applied to gated clamp 20 to place the gated clamp in the closed condition during the time interval between 0.2 and 13.5 microseconds. In a similar manner, gating circuit 22B is controlled by a signal received from gating circuit 22C to provide signal I that is applied to gated clamp 19C to place the gated clamp in the closed condition during the time interval between 0.3 microsecond and 12.5 microseconds; and gating clamp 22A, controlled by a signal received from gating circuit 22B, provides signal J which is applied to and simultaneously places gated clamps 19A and 19B in the closed condition during the time interval between 0.4 and 11.5 microseconds. It is, of course, understood that the time intervals, pulse durations and repetition rates shown in Figs. 5A to 5D are merely illustrative and that other time intervals and signals having different waveforms may be used in a particular application as desired.

Figure 5C:
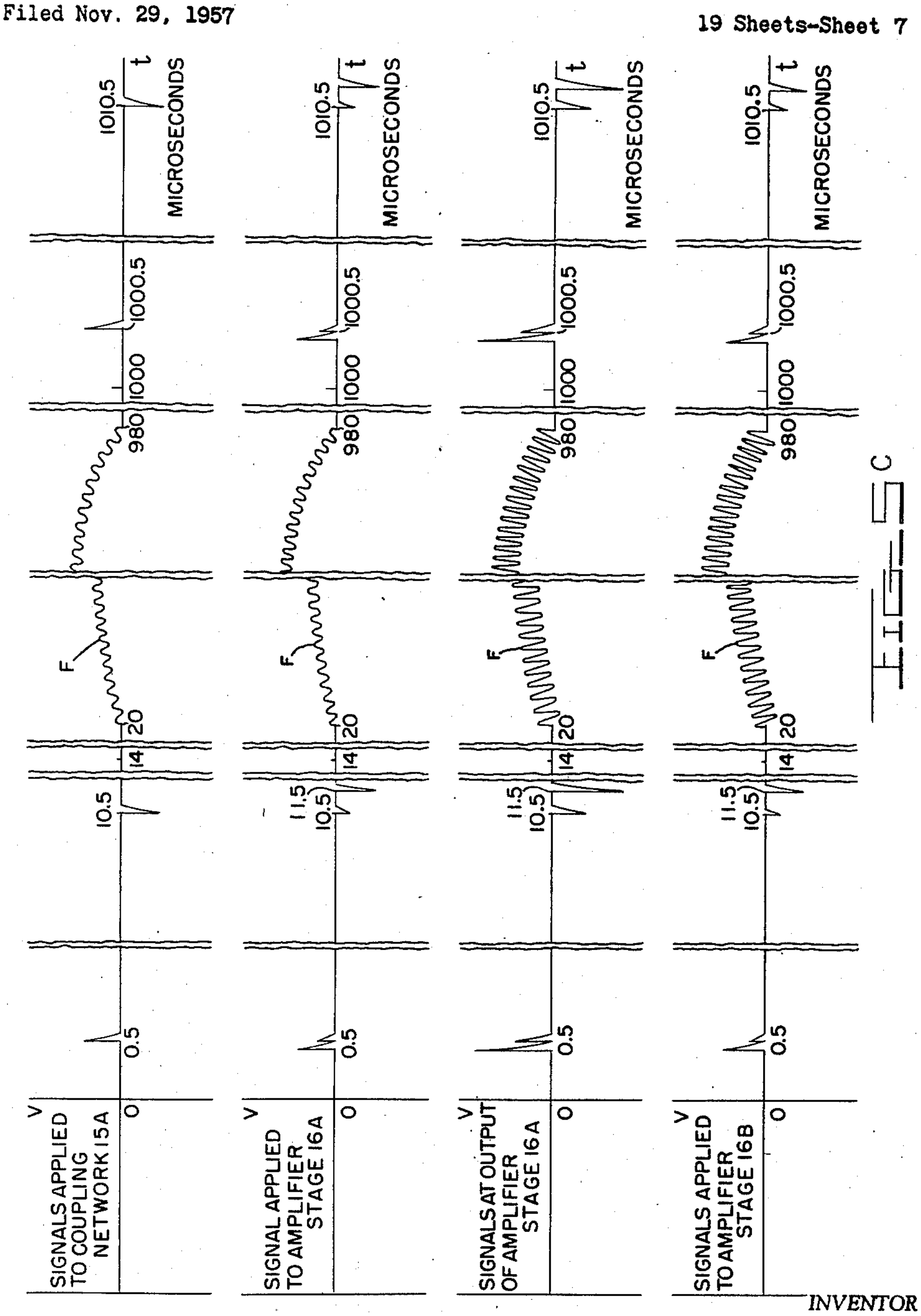

Referring to Figs. 5B and 5C, it is noted that the first signals applied to coupling network 15A consists of transients appearing at 0.5 and 10.5 microseconds and that the second signals include a sine wave signal appearing between 20 and 980 microseconds. When the first signals are applied to gated clamp 19A, the gated clamp is in the closed condition during the time interval between 0.4 and 11.5 microseconds, and therefore, the transients appearing at 0.5 and 10.5 microseconds are attenuated. Although the transients appearing at 0.5 and 10.5 microseconds at gated clamp 19A are shown in Fig. 5C as small spikes, the magnitude of the transients are approximately 95% attenuated and would, if drawn to scale, be almost invisible. The operation of gated clamp 19A generates a transient at 0.4 and 11.5 microseconds which together with the transients occurring at 0.5 and 10.5 microseconds are applied to and are amplified in amplifier stage 16A. Since gated clamp 19B is closed during time interval between 0.4 and 11.5 microseconds, the magnitude of the transients occurring at 0.5 and 10.5 microseconds are attenuated 95% and transients that increase the transients at 0.4 and 11.5 microseconds are generated by the gated clamp. The above transients are applied to and appear as amplified spikes in the output of amplifier stage 16B, as shown in Fig. 5C. When the signal is applied from the output of amplifier stage 16B through coupling network 15C to gated clamp 19C, since gated clamp 19C is in the closed condition during the time interval which extends from 0.3 to 12.5 microseconds, the magnitude of each of the above transients are attenuated 95% and transients are introduced at 0.3 and 12.5 microseconds. At gated clamp 20, which is in the closed condition during the time interval between 0.2 and 13.5 microseconds, ringing introduced by high pass filter 18 to which gated clamp 20 is connected and transients introduced by the gated clamps that precede gated clamp 19D are attenuated and transients are introduced by gated clamp 20 at 0.2 and 13.5 microseconds. And finally, at gated clamp 20, closed during the time interval between 0.1 and 14.5 microseconds, ringing caused by high pass filter 18 and transients caused by the gated clamps that precede gated clamp 19D are attenuated and transients are introduced by the operation of the gated clamp at 0.1 and 14.5 microseconds. The magnitude of the transients occurring at 0.1 and 14.5 microseconds, if drawn to scale, would be almost invisible.

Figure 5D:
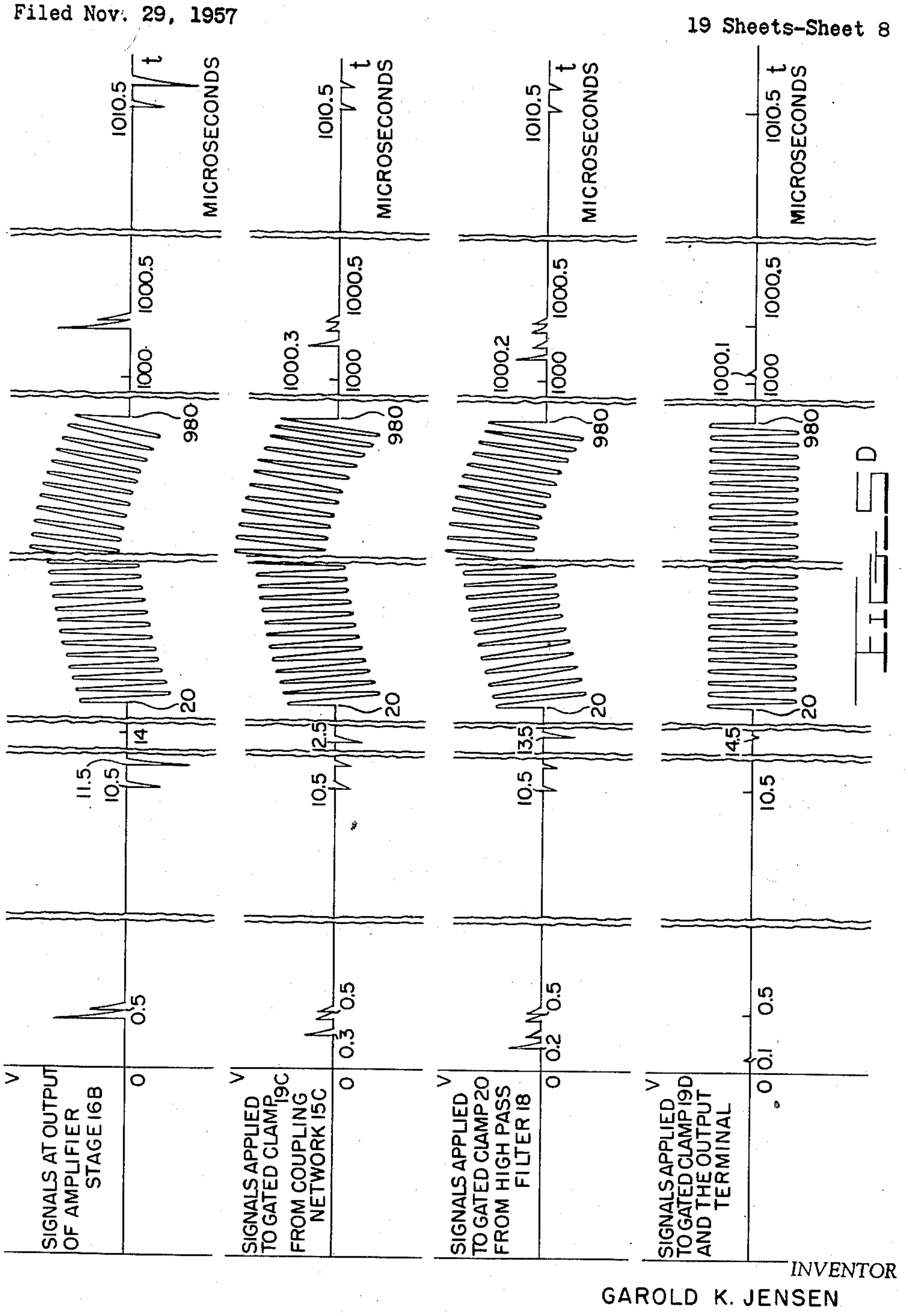
Figure 5:
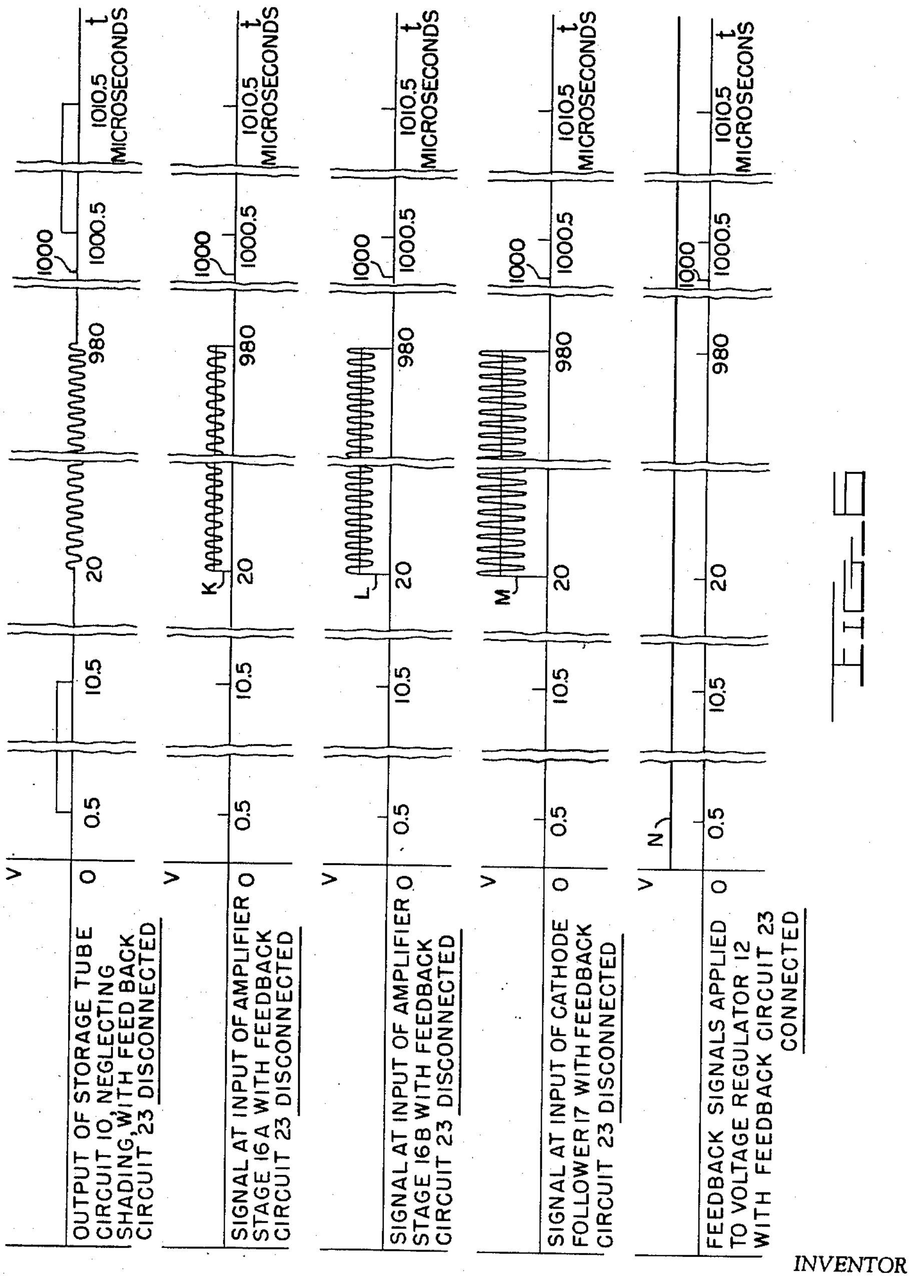

Referring to Fig. 5D, if high pass filter 18 were not connected in the arrangement shown in Fig. 1, the waveform of the signal that would be applied to gated clamp 20 from cathode follower 17 in the time interval between 20 and 980 microseconds would consist of a high frequency sine wave superimposed on a low frequency sine wave. The latter, which is dependent on the inherent charactertistics of storage tube 47 in storage tube circuit 10, is removed by high pass filter 18 to provide the signal shown in Fig. 5D that is applied to gating circuit 19D and the output terminal.

In summary, the first signal applied to coupling network 15A from storage tube circuit 10 includes transients occurring at 0.5 and 10.5 microseconds and the second signal applied to the coupling network during the time interval between 20 and 980 microseconds includes a high frequency sine wave signal superimposed on a low frequency sine wave signal. The low frequency sine wave signal is removed by high pass filter 18. The transients in the first signal are substantially attenuated by placing gated clamps 19A and 19B in the closed condition during the time interval between 0.4 and 11.5 microseconds. The transients caused by the operation of gated clamps 19A to 19D and 20 as well as the ringing introduced by high pass filter 18 are substantially attenuated by closing gated clamps 19C, 20 and 19D in a selected order and opening the gated clamps in an order inverse to the selected order so that each of the gated clamps, starting with gated clamp 19C on the left in Fig. 1, is closed a predetermined time interval after and is opened a predetermined time interval before the succeeding gated clamp.

Referring to Fig. 6, the first waveform in this figure represents the output of storage tube circuit 10, neglecting the signal causing shading, with the feedback circuit 23 in Fig. 1 disconnected. Due to the unbalance of electron tubes 32 and 37 in Fig. 2, the square wave signal occurring between 0.5 and 10.5 microseconds is developed when the electron tubes conduct during the write sweep. During the time interval between 0.4 to 11.5 microseconds, gated clamps 19A and 19B, as shown in Fig. 5B, are closed completing a low impedance path to ground as shown in Fig. 3. Since current flows through capacitor 56, resistor 57, and gated clamp 19A, capacitor 56 charges to a capacitor voltage having a magnitude that is dependent on the magnitude of the square wave occurring between 0.5 and 10.5 microseconds shown in the first waveform in Fig. 6. As shown in Fig. 5B, gated clamp 19A is in the open condition during the read sweep occurring during the time interval between 20 and 980 microseconds. During this time interval, capacitor 56 discharges through a circuit that includes resistors 57 and 57A. Since the discharge circuit has a long time constant in comparison with the period of the read sweep, the capacitor will discharge only a small percentage during the read sweep. After a few cycles of operation, capacitor 56 charges to a constant magnitude so that a constant direct current voltage is developed across the capacitor on which the signal derived from storage tube circuit 10 during the read sweep is superimposed, as shown by the waveform of signal K in Fig. 6. Signal K is applied to the input of amplifier stage 16A where it is amplified to provide signal L which in turn is applied to and is amplified by amplifier stage 16B to provide signal M. The last mentioned signal, as shown in Fig. 4, is applied through reistor 85 to the control grid of electron tube 86 in feedback circuit 23. Resistor 85 and capacitor 87 form a filter circuit so that a direct current signal is applied to the control grid of electron tube 86 in dependency on the magnitude and duty cycle of signal M. The signal applied to the control grid of electron tube 86 is amplified by the electron tube to develop signal N which is applied through the coupling network that consists of variable resistor 90, neon tubes 91 to 93 in feedback circuit 23 in Fig. 4 and capacitor 44 and resistor 39 to the control grid of electron tube 37 in voltage regulator 12 in Fig. 2. The magnitude of signal N is adjusted to balance the current through electron tubes 32 and 37, as shown in Fig. 2, to substantially remove the square wave signal occurring during the time interval between 0.5 and 10.5 microseconds in the first waveform in Fig. 6. Thus, feedback circuit 23 may be employed to balance electron tubes 32 and 37 and thereby stabilize the base line of the signal provided by storage tube circuit 10 during the read sweep of storage tube 47.

Figure 7:
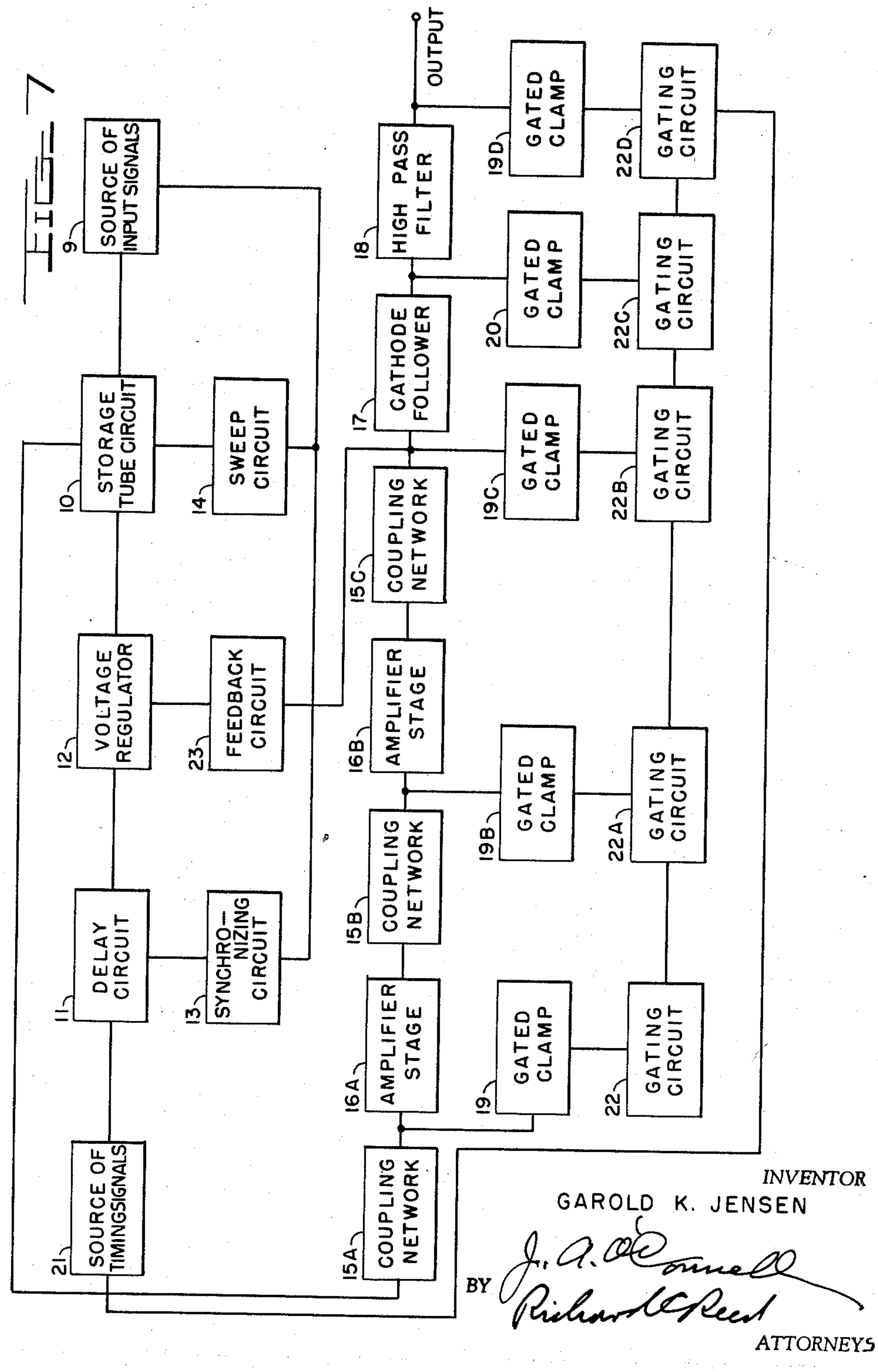
Fig. 7 is a second embodiment of the present invention.

Referring to Fig. 7, it is noted that the second embodiment of the present invention employs the same components as the first embodiment disclosed in Fig. 1. However, in the second embodiment it is noted that gated clamps 19 and 19B, individually controlled by gating circuits 22 and 22A, are connected to amplifier stages 16A and 16B, respectively. Gated clamp 19 is identical with gated clamp 19A shown in Fig. 3. The operation of the second embodiment shown in Fig. 7 is the same as the operation of the first embodiment shown in Fig. 1 except that in the second embodiment gating circuits 22 to 22D control gated clamps 19 to 19D and 20 so that starting with gated clamp 19, at the left in Fig. 1, each gated clamp is closed a predetermined time interval after and is opened a predetermined time interval before the succeeding gated clamp.

The analysis of the operation of the second embodiment is the same as the analysis of the first embodiment with reference to the waveforms of the signals in Figs. 5A to 5D. In the second embodiment, gated clamp 19A is maintained in the closed condition during the time interval between 0.4 and 11.5 microseconds, as shown in Fig. 5B, and gated clamp 19 is closed after and opened before gated clamp 19A. Hence, the operation of the first and second embodiment of the present invention is the same except that while in the first embodiment gated clamps 19A and 19B are simultaneously in the closed condition during the time interval between 0.4 and 11.5 microseconds, in the second embodiment gated clamps 19 and 19B are sequentially closed in a first selected order and sequentially opened in an order inverse to the first selected order such that the time interval during which gated clamp 19 is in the closed condition starts after and terminates before the time interval during which gated clamp 19B is in the closed condition.

Referring to Fig. 8, in the third embodiment of the present invention, source of input signals 9, sweep circuit 14 and voltage regulator 12 are connected to storage tube circuit 10. Source of timing signals 21 is connected through delay circuit 11 to voltage regulator 12 and synchronizing circuit 13 is connected to gating circuit 105, sweep circuit 14, and source of input signals 9. The output of storage tube circuit 10 is connected to amplifier stage 101 through coupling network 100. Amplifier stage 101 is connected through coupling network 100A to amplifier stage 101A which in turn is connected to cathode follower 102 through coupling network 100B. Coupling network 103 is connected between cathode follower 102 and cathode follower 104. An output terminal is connected to cathode follower 104. Gating circuit 105 is connected to and simultaneously controls gated clamps 106A, 106B, and 106C. Gated clamp 106A is connected between amplifier stage 101 and coupling network 100A; gated clamp 106B is connected between amplifier stage 101A and coupling network 100B; and gated clamp 106C is connected to coupling network 103.

Referring to Figs. 8 and 9A and 9B, the hollow rectangles connected in the circuit below the dotted line AA—BB in Fig. 8 are shown in detail in Figs. 9A and 9B. In Fig. 9A, the output of storage tube circuit 10 is connected to the control grid of electron tube 111 through capacitor 110. The suppressor grid of electron tube 111 is connected to the cathode of electron tube 111, the control grid is connected to ground through resistor 112, and the cathode is connected to ground through resistor 113. Capacitor 114 is connected across resistor 113. The plate of electron tube 111 is connected to a source of B+ through resistor 115 and tuned circuit 116, the latter consisting of coil 117 connected in parallel with capacitor 118. Tuned circuit 116 is connected to ground through capacitor 119 and is also connected to ground through capacitor 120. Capacitor 120, having a value of approximately 20 mf., suppresses low frequency power supply variations; and capacitor 119, having a value of approximately 0.2 mmf., by-passes high frequency signals. The plate of electron tube 111 is connected through capacitor 122 to the control grid of electron tube 123. The amplifying circuit in which electron tube 123 is connected is substantially identical with the circuit in which electron tube 111 is connected. Tuned circuit 124, which is identical with tuned circuit 116, is connected in the plate circuit of electron tube 123. The plate of electron tube is connected through capacitor 125 and resistor 126 to the control grids of electron tube 127. The latter electron tube is connected in a circuit that is a conventional cathode follower except that resistor 126 is connected in the grid circuit and resistor 128 is connected in the plate circuit of electron tube 127 to suppress parasitic oscillations, capacitor 129, having a value in the order of 20 mf., is connected between resistor 128 and ground to suppress low frequency power supply variations, and capacitor 130, having a value in the order of 0.2 mmf., is connected between resistor 128 and ground to by-pass high frequency signals. The cathode of electron tube 127 is connected through capacitor 132, resistor 133, capacitor 134 and resistor 135 to the control grids of electron tube 136. The cathode follower circuit in which electron tube 136 is connected is substantially the same as the circuit in which electron tube 127 is connected. An output terminal is coupled through capacitor 37 to the cathode of electron tube 136.

Continuing the description of the arrangement disclosed in Fig. 9A, electron tubes 140, 141 and 142 are connected in gated clamp 106A, electron tubes 143, 144 and 145 are connected in gated clamp 106B, and electron tubes 146, 147 and 148 are connected in gated clamp 106C. Each of the gated clamps 106A, 106B and 106C have a closed condition during which they conduct and an open condition during which they are in a non-conducting condition. Gated clamps 106A, 106B and 106C are identical to gated clamp 19A, discussed in detail above in connection with Fig. 3, except that each of the electron tubes are biased so that gated clamps 106A, 106B and 106C are in the closed condition in the absence of a control signal.

Referring to Fig. 9B, electron tubes 150, 151 and 152 are connected in gating circuit 105 which is identical with gating circuit 22A disclosed and discussed in detail in connection with Fig. 3. The output of synchronizing circuit 13 is applied through capacitor 154 to the control grid of electron tube 152. The output of gating circuit 105, derived from the plate of electron tube 150, is applied to and simultaneously controls gated clamps 106A, 106B and 106C.

Referring to the block diagram in Fig. 8, the details of the storage tube circuit 10 and voltage regulator 12 in Fig. 2, and the waveforms of the signals of Figs. 10A, 10B, and 10C, signal O is applied to delay circuit 11 from the source of timing signals 21. Signal O, a square wave having a duration of 250 microseconds and a repetition rate of 1000 pulses per second, is delayed 0.5 microsecond by delay circuit 11 to provide signal P which is applied to synchronizing circuit 13 and to the control grids of electron tubes 32 and 37 in storage tube circuit 10.

Referring to Fig. 2, the potential at point AB is zero when electron tubes 32 and 37 in voltage regulator 12 are in their normal cut-off condition. When waveform P is applied to the control grids of these electron tubes, driving the electron tubes into conduction, waveform Q, having a magnitude of 50 volts, is developed at point AB and is applied to the plate of storage tube 47. When electron tubes 32 and 37 are in their normal cut-off condition, the potential at point AC is zero. If the electron tubes are balanced, when driven into conduction, since the current through electron tube 32 will increase the potential at point AC and the current through electron tube 37 will decrease the potential at point AC, the potential at this point will continue to have zero magnitude.

Referring to Figs. 8 and 10A, signal P is applied to synchronizing circuit 13 which provides an output signal to synchronize sweep circuit 14 and source of input signals 9 so that signal V is applied during the write sweep to the cathode of storage tube 47 in storage tube circuit 10 to intensity modulate the cathode beam of the storage tube. During the same time interval, signal P is applied to the control grids of electron tubes 32 and 37 to drive the electron tubes into conduction so that signal Q having a magnitude of 50 volts is applied to the plate of storage tube 47 while the screen is maintained at zero potential. Consequently, electrical charges whose magnitudes are representative of signals V are stored on discrete areas of the target dielectric of storage tube 47.

Due to the unbalance in electron tubes 32 and 37 in Fig. 2, when the electron tubes conduct during the write sweep, square wave signal WA is developed across resistor 48 in storage tube circuit 10 in Fig. 2 and is applied to coupling network 100 in Fig. 8.

During the read sweep, signal P is not applied to the control grids of electron tubes 32 and 37. The electron tubes are cut off and the potential at point AB and at the plate of storage tube 47 is zero. Since the plate of the storage tube is lowered from 50 volts, the potential at which it is maintained during the write sweep, to 0 volts, the potential during the read sweep, the electrical charges stored during the write sweep are lowered 50 volts and are in the negative range during the read sweep. Hence since the screen of storage tube 47, which is connected to point AC, is zero during the read sweep, the electrical charges stored on the dielectric target of the storage tube are knocked off by the cathode beam and are attracted to the screen of the storage tube. Some of these electrical charges are collected by the screen but the majority of the electrical charges flow to the collector of storage tube 47 and from the collector through B+, ground, and resistor 48 to the plate of the storage tube. Thus, signal WB, which is representative of the electrical charges stored on the target dielectric of storage tube 47, is developed across resistor 48 and is applied to coupling network 100.

As shown in Fig. 8, synchronizing circuit 13 applies a signal to gating circuit 105 which controls gated clamps 106A, 106B, and 106C. The last three mentioned gated clamps are controlled in the same manner as gated clamp 19A is controlled in the arrangement disclosed in Fig. 2, except electron tubes 140, 141, 143, 144, 146 and 147 in Fig. 9A are biased so that gated clamps 106A, 106B and 106C are biased normally in the closed condition and the control grids of electron tubes 142, 145 and 148 are biased by voltage X in Fig. 10C so that each of the electron tubes is cut-off. During the time interval between 275.5 and 525.5 microseconds, a voltage of equal magnitude and opposite polarity to that of voltage X is simultaneously applied to the control grids of electron tubes 142, 145 and 148 to drive the electron tubes into conduction. Hence, during this time interval, a negative voltage is applied to the plates of electron tubes 141, 144, and 147 and a positive voltage is applied to the cathodes of electron tubes 140, 143 and 146 to place gated clamps 106A, 106B and 106C in the open condition.

Referring to Figs. 8 and 9A, signals WA and WB are applied from the output of storage tube circuit 10 through coupling network 100 to the grid of electron tube 111 in amplifier stage 101. If gated clamp 106A were not connected in the arrangement shown in Fig. 8, during the leading and trailing edges of signal WA, electron tube 111 and tuned circuit 116 would function as a shock excited oscillator to generate a series of damped oscillations as represented by signal YA and signal WB would be amplified to provide signal YB as represented in Fig. 10B. However, since gated clamp 106A is closed during the time interval between 0 and approximately 275.5 microseconds forming a low impedance path from tuned circuit 116 to ground, the series of damped oscillations generated by electron tube 111 and tuned circuit 116 are substantially shunted to ground. The gated clamp is in the open condition in the time interval between approximately 275.5 and 525.5 microseconds so that signal WB is amplified to provide signal YC in the output of amplifier stage 101. Signal YC includes spikes generated by the operation of gated clamp 106A at 275.5 and 525.5 microseconds. When signal YC is applied from amplifier stage 101 through coupling network 100A to amplifier stage 101A, if gated clamp 106A were not connected in the arrangement shown in Fig. 8, the spikes would excite electron tube 123 and tuned circuit 124 in amplifier stage 101A, which form a shock excited oscillator, to generate two series of damped oscillations, one starting at 275.5 microseconds and the other starting at 525.5 microseconds, in the output of amplifier stage 101A as shown by signal BX in Fig. 10C. However, since gated clamp 106B is closed during the time interval between 0 and approximately 275.5 microseconds and between 525.5 and approximately 1,275.5 microseconds, the two series of damped oscillations are substantially shunted to ground as shown by signal BY in Fig. 10C. When signal BY is applied through coupling network 100B and cathode follower 102 to coupling network 103, gated clamp 106C operates in the same manner as gated clamp 106B to substantially remove the series of damped oscillations in signal BY starting at 275.5 and 525.5 microseconds. Thus, the first and second series of damped oscillations occurring in signal BX are substantially removed; and when signal BY is applied to cathode follower 104, signal BZ is developed at the output terminal in Fig. 8.

To understand how the series of damped oscillations in signal BX starting at 275.5 is attenuated, consider the waveforms in Fig. 11. Voltage AT is an enlarged detail of the trailing edge of voltage X and waveform AU is an enlarged detail of the first half cycle of the series of damped oscillations starting at 275.5 microseconds in signal BX. It is noted that the first 0.2 microsecond of the time interval during which waveform AU rises from 0 to maximum magnitude, waveform AT decreases from maximum negative magnitude to zero. This indicates that gated clamp 106B is partially closed during the first 0.2 microsecond rise of signal AU, offering the signal a low impedance path to ground. Hence, part of the energy of waveform AU that otherwise would excite tuned circuit 124 to generate a series of damped oscillations is shunted to ground and the series of damped oscillations occurring at 275.5 microseconds in signal BX is substantially attenuated. Similarly, the series of damped oscillations starting at 525.5 microseconds in signal BX is attenuated since gated clamp 106B starts to close at 525.5 microseconds and remains in the closed condition until approximately 1,275.5 microseconds.

Due to the inherent characteristics of storage tube 47, the signal developed by storage tube circuit 10 and applied to coupling network 100 during the read sweep, i.e., the time interval between 275.5 and 525.5 microseconds, includes a signal that causes shading of the signal read out of the storage tube. In the embodiment of the present invention shown in Fig. 8, the frequency of this signal will be approximately 1.0 kc. The frequency of the signal applied from the source of input signals 9 to the cathode of storage tube 47 is 400 kc.; and since the durations of the read sweep and the write sweep are equal, the frequency of the signal read out of storage tube 47 and applied to coupling network 100 is also 400 kc. Tuned circuit 116 in amplifier stage 101 and tuned circuit 124 in amplifier stage 101A are selected to offer a low impedance to the 1.0 kc. signal causing shading and a high impedance to a small band of frequencies around 400 kc. Hence, the 1.0 kc. signal is not amplified in amplifier stages 101 and 101A and is substantially removed from the output of the embodiment shown in Fig. 8.

In summary, the signals representative of the energy stored on the dielectric target of storage tube 47 and the square wave signals are applied from the output of storage tube circuit 10 to coupling network 100. The leading and trailing edges of each of the square wave signals excite tuned circuit 116 and electron tube 111, which form a shock excited oscillator, to generate a first and second series of damped oscillations. The first series of damped oscillations is substantially attenuated by maintaining gated clamp 106A partially closed during the time interval in which the first half cycle of the damped oscillations occurs. The second series of damped oscillations is substantially attenuated by partially closing gated clamp 106A at the instant the trailing edge of the square wave signal is applied to the control grid of electron tube 111 and by maintaining the gated clamp in the closed condition for a predetermined time interval having a duration that exceeds the duration of the damped oscillations. The operation of gated clamp 106A develops spikes that excite electron tube 123 and tuned circuit 124 in amplifier stage 101A to generate two series of damped oscillations. The last mentioned series of damped oscillations are substantially shunted to ground by the operation of gated clamps 106B and 106C. Gated clamp 106C introduces small spikes in the signal appearing at the output terminal in Fig. 8; but these spikes are so small that they would be almost invisible if signal BZ were drawn to scale in Fig. 10C. Tuned circuits 116 and 124, in amplifier stages 101 and 101A, respectively, are selected to offer a low impedance to the signals causing shading so that these signals are not amplified and are substantially removed from the signals applied to coupling network 100. In this way, the square wave signals and the undesirable signals causing shading of the signal read out of storage tube 47 are substantially attenuated and the signals appearing at the output terminal of the embodiments shown in Fig. 8 are an accurate representation of the signals applied to the cathode of storage tube 47 by the source of input signals 9.

Referring to Fig. 12, it is noted that the fourth embodiment of the present invention employs the same components as the third embodiment disclosed in Fig. 8. However, in the fourth embodiment gated clamps 106A, 106B and 106C, shown in detail in Fig. 9A, are individually controlled by gating circuits 170A, 170B and 170C, respectively. Gating circuits 170A, 170B and 170C are each identical with gating circuit 22A shown in detail in Fig. 3. The operation of the fourth embodiment is the same as the operation of the third embodiment except that in the fourth embodiment gating circuits 170A, 170B, and 170C control gated clamps 106A, 106B and 106C so that starting with gated clamp 106A, at the left in Fig. 12, each gated clamp is opened a predetermined time interval before and is closed a predetermined time interval after the succeeding gated clamp.

Referring to Figs. 9A, 12 and 13B, electron tubes 140, 141, 143, 144, 146, and 147 are normally biased so that gated clamps 106A, 106B and 106C, respectively, are normally in the closed condition. Synchronizing circuit 13 in Fig. 12 applies a signal to an controls gating circuit 170C, which in turn controls gating circuits 170A and 170B such that signals CZ, CY and CX represent the summation of the bias applied to the control elements of electron tube 142 in gated clamp 106A, of electron tube 145 in gated clamp 106B, and of electron tube 148 in gated clamp 106C, respectively. It is noted that, during the time interval between 276.1 and 525.5 microseconds, the sum of bias, i.e., the sum of the magnitude of C— and the magnitude of the positive pulse applied from gated clamp 170A to the control element of electron tube 142 has a zero value. Hence, electron tube 142 is driven into conduction and applies a negative voltage to the plate of electron tube 141 and a positive voltage to the cathode of electron tube 140 to place gated clamp 106A in a completely open condition in the time interval between 276.1 and 525.5 microseconds. The gated clamp is partially closed during the time interval between 275.5 and 276.1 microseconds. In a similar manner, gated clamp 106B is completely open during the time interval between 276.7 and 524.5 microseconds and partially closed between 276.1 and 276.7 microseconds; and gated clamp 106C is completely open during the time interval between 277.3 and 523.5 microseconds and partially closed between 276.7 and 277.3 microseconds.

Referring to Figs. 12, 13A and 13B, during the write sweep of storage tube 47, square wave signal CA is developed across resistor 48 in storage tube circuit 10 in Fig. 2 and is applied to coupling network 100 in Fig. 12; and during the read sweep, signal CB, which is representative of the electrical charges stored on the target dielectric of storage tube 47, is developed across resistor 48 and is applied to coupling network 100. If gated clamp 106A were not connected in the arrangement shown in Fig. 12, the leading and trailing edges of square wave signal CA would control electron tube 111 and tuned circuit 116, which form a shock excited oscillator, to generate the series of damped oscillations CC shown in Fig. 13A. Signal CB is amplified to provide signal CD in the output of amplifier stage 101. However, since gated clamp 106A is in the closed condition during the time interval between 0 and 275.5 microseconds forming a low impedance path from tuned circuit 116 to ground, the series of damped oscillations CC are substantially shunted to ground. Signal CB is applied to and amplified in amplifier stage 101 to provide signal CE which includes spikes occurring at 276.1 and 525.5 microseconds which are generated during the operation of gated clamp 106A. When signal CE is applied from amplifier stage 101 through coupling network 100A to amplifier stage 101A, if gated clamp 106B were not connected in the arrangement shown in Fig. 12, the spikes would excite electron tube 123 and tuned circuit 124 in amplifier stage 101A, which form a shock excited oscillator, to generate two series of damped oscillations, one starting at 276.1 and 525.5 microseconds, in the output of amplifier stage 101A as shown by signal CF. However, since gated clamp 106B is partially closed during the time interval between 275.5 and 276.1 microseconds and completely closed in a time interval starting at 525.5 microseconds, the two series of damped oscillations in signal CF are substantially shunted to ground as shown by signal CG. When signal CG is applied from amplifier stage 101A through coupling network 100B and cathode follower 102 to coupling network 103, if gated clamp 106C were not connected in the arrangement shown in Fig. 12, the output of cathode follower 104 would include two series of oscillations, one starting at 276.7 and the other starting at 524.5 microseconds, each having exceedingly small magnitudes and infinitesimal spikes generated by gated clamp 106B at 276.7 and 524.5 microseconds as shown by signal CH. However, since gated clamp 106C is partially closed during the time interval between 276.7 and 277.3 microseconds and completely closed during the time interval starting at 523.5 microseconds, the last mentioned spikes and series of oscillations are substantially removed as shown by signal CI in Fig. 13B. The operation of gated clamp 106C generates infinitesimal spikes at 277.3 and 523.5 microseconds. If these spikes were represented to scale in the representation of signal CI, which appears at the output terminal of the arrangement shown in Fig. 12, they would be so small as to be almost invisible.

The explanation of the manner in which gated clamps 106A, 106B and 106C, shown in Fig. 12 operate to substantially remove the respective series of damped oscillations discussed above is the same as the explanation set forth supra in connection with the waveforms in Fig. 11. Likewise, the signals causing shading that are developed in the fourth embodiment are removed in the same manner as the signals causing shading in the third embodiment, as discussed above.

Referring to Figs. 12 and 13A, gating circuits 170A, 170B and 170C may be selected so that gated clamps 106A, 106B and 106C are simultaneously closed at 525.5 microseconds. Then, gated clamp 106A will be partially closed in the time interval between 275.5 and 276.1 microseconds, completely open between 276.1 and 525.5 microseconds, and in the closed condition in the time interval starting at 525.5 microseconds. In a similar manner, gated clamps 106B and 106C will be partially closed in the time interval between 276.1 and 276.7 microseconds and between 276.7 and 277.3 microseconds, respectively, completely open between 276.7 and 525.5 microseconds and between 277.3 and 525.5 microseconds, respectively, and both gated clamps will be in the closed condition in the time interval starting at 525.5 microseconds.

The operation of the last mentioned arrangement will be the same as that of the fourth embodiment, except that each of the gated clamps 106A, 106B and 106C will simultaneously attenuate the series of damped oscillations starting at 525.5 microseconds in signal CF as shown in Fig. 13A.

It should be understood, of course, that the foregoing disclosure relates only to preferred embodiments of the present invention and that numerous modifications and alterations may be made therein without departing from the spirit and scope of the invention as set forth in the appended claims.

What is claimed is:

1. In an electrical system, a storage tube circuit including a first output circuit and a storage tube having at least a screen and a plate, a sweep circuit connected to said storage tube for providing the storage tube with write sweeps and a read sweeps, a source of input signals providing intelligence signals, means connecting the source of input signals to said storage tube, a voltage regulator circuit comprising biasing means for providing a substantially constant bias and means for providing first control signals and second control signals, means for connecting said last mentioned means to the plate of said storage tube, means for connecting said biasing means to the screen of said storage tube, means connected to said voltage regulator circuit and said sweep circuit for controlling the voltage regulator circuit and the sweep circuit such that a first control signal is applied to the plate of said storage tube and an undesired signal is applied to said first output circuit during each write sweep and such that a second control signal is applied to the plate of said storage tube during each of said read sweeps, means connected to said source of input signals and said sweep circuit for controlling the source of input signals and the sweep circuit such that each intelligence signal is applied to the storage tube during a respective write sweep and such that a desired signal is applied to said first output circuit during each of said read sweeps, a plurality of amplifier stages connected in cascade, means connecting said first output circuit to a first one of said plurality of amplifier stages, a second output circuit, means connecting said second output circuit to another one of said plurality of amplifier stages, a plurality of gated clamps, each of said plurality of gated clamps having a closed condition and an open condition, means connecting each of said plurality of gated clamps to a respective one of said plurality of amplifier stages, and means connected to said plurality of gated clamps for controlling the plurality of gated clamps such that each of the plurality of gated clamps is maintained in the closed condition in selected time intervals, each of said selected time intervals starting before and terminating after the start and termination of a respective one of the undesired signals.

2. In an electrical system, means for alternately and repetitively producing first signals occurring in first selected time intervals and second signals occurring in second selected time intervals, a plurality of amplifier stages connected in cascade, means connecting said first mentioned means to a first one of said plurality of amplifier stages, an output circuit, means connecting said output circuit to a second one of said amplifier stages, a plurality of gated clamps, each of said plurality of gated clamps having a closed condition and an open condition, means connecting each of said plurality of gated clamps to a respective one of said amplifier stages, an additional gated clamp having a closed condition and an open condition, means connecting said additional gated clamp to said output circuit, means connected to said plurality of gated clamps for maintaining each of said plurality of gated clamps in the closed condition during third selected time intervals, each of said third selected time intervals starting before and terminating after the start and termination of a rsepective one of said first selected time intervals, and means connected to said additional gated clamp for maintaining said additional gated clamp in the closed condition during fourth selected time intervals, each of said fourth selected time intervals starting before and terminating after the start and termination of a respective one of said third selected time intervals.

3. In an electrical system, a storage tube circuit including a storage tube and a first output circuit, a sweep circuit connected to said storage tube for providing the storage tube with write sweeps and read sweeps, a source of input signals providing intelligence signals, means connecting said source of input signals to said storage tube, means connected to said storage tube circuit, said source of input signals and said sweep circuit for controlling the storage tube circuit, the source of input signals and the sweep circuit such that each intelligence signal is applied to the storage tube and an undesired signal is applied to said first output circuit during a respective write sweep and such that a desired signal is applied to said first output circuit during a respective read sweep, a plurality of amplifier stages connected in cascade, means connecting said first output circuit to a first one of said plurality of amplifier stages, a second output circuit, means connecting said second output circuit to another one of said plurality of amplifier stages, a plurality of gated clamps, each of said plurality of gated clamps having a closed condition and an open condition, means for connecting each of said plurality of gated clamps to a respective one of said plurality of amplifier stages, an additional gated clamp having an open condition and a closed condition, means connecting said additional gated clamp to said second output circuit, means connected to said plurality of gated clamps for maintaining each of said plurality of gated clamps in the closed condition during first selected time intervals, each of said first selected time intervals starting before and terminating after the start and termination of one of the undesired signals, and means connected to said additional gated clamp for maintaining said additional gated clamp in the closed condition during second selected time intervals, each of said second selected time intervals starting before and terminating after the start and termination of a respective one of said first selected time intervals.

4. In an electrical system, means for alternately and repetitively producing first signals occurring in first selected time intervals and second signals occurring in second selected time intervals, a plurality of amplifier stages connected in cascade, means connecting said first mentioned means to a first one of said plurality of amplifier stages, an output circuit, means connecting said output circuit to a second one of said amplifier stages, a plurality of gated clamps, each of said plurality of gated clamps having a closed condition and an open condition, means connecting each of said plurality of gated clamps to a respective one of said amplifier stages, an additional gated clamp having a closed condition and an open condition, means connecting said additional gated clamps to said output circuit, means connected to said plurality of gated clamps for maintaining each of said plurality of gated clamps in the closed condition during third selected time intervals, each of said third selected time intervals starting before and terminating after the start and termination of a respective one of said first selected time intervals, means connected to said additional gated clamp for maintaining said additional gated clamp in the closed condition during fourth selected time intervals, each of said fourth selected time intervals starting before and terminating after the start and termination of a respective one of said third selected time intervals, and means connected between said output circuit and said first mentioned means and responsive only to the magnitude of the first signals in said output circuit for controlling the magnitude of only said first signals provided by said first mentioned means.

5. In an electrical system, a storage tube circuit including a storage tube and a first output circuit, a sweep circuit connected to said storage tube for providing the storage tube with write sweeps and read sweeps, a source of input signals providing intelligence signals, means for connecting said source of input signals to said storage tube, means connected to said storage tube circuit, said source of input signals and said sweep circuit for controlling the storage tube circuit, the source of input signals and the sweep circuit such that each intelligence signal is applied to the storage tube and an undesired signal is applied to said first output circuit during a respective write sweep and such that a desired signal is applied to said first output circuit during a respective read sweep, a plurality of amplifier stages connected in cascade, means connecting said first output circuit to a first one of said plurality of amplifier stages, a second output circuit, means connecting said second output circuit to another one of said amplifier stages, a plurality of gated clamps, each of said plurality of gated clamps having a closed condition and an open condition, means for connecting each of said plurality of gated clamps to a respective one of said plurality of amplifier stages, an additional gated clamp having an open condition and a closed condition, means connecting said additional gated clamp to said second output circuit, means connected to said plurality of gated clamps for maintaining each of said plurality of gated clamps in the closed condition during first selected time intervals, each of said first selected time intervals starting before and terminating after the start and termination of a respective one of said undesired signals, means connected to said additional gated clamp for maintaining said additional gated clamp in the closed condition during second selected time intervals, each of said second selected time intervals starting before and terminating after the start and termination of a respective one of said first selected time intervals, and means connected between said output circuit and said first mentioned means and responsive only to the magnitude of the first signals in said output circuit for controlling the magnitude of said first signals provided by said first mentioned means.

6. In an electrical system, means for producing first signals and second signals occurring in first selected intervals and third signals and fourth signals occurring in second selected time intervals, said first selected time intervals and said second selected time intervals occurring alternately and repetively, a plurality of amplifier stages connected in cascade, means connecting said first mentioned means to a first one of said amplifier stages, filter means for substantially suppressing said third signals and for passing said fourth signals, an output circuit, means connecting said filter means between said output circuit and a second one of said plurality of amplifier stages, a plurality of gated clamps, each of said plurality of gated clamps having an open condition and a closed condition, means connecting each of said plurality of gated clamps to a respective one of said plurality of amplifier stages, an additional gated clamp having a closed condition and an open condition, means connecting said additional gated clamp to said filter means, means connected to said plurality of gated clamps for maintaining each of said plurality of gated clamps in the closed condition during third selected time intervals, each of said third selected time intervals starting before and terminating after the start and termination of a respective one of said first selected time intervals, means connected to said additional gated clamp for maintaining said additional gated clamp in the closed condition during fourth selected time intervals, each of said fourth selected time intervals starting before and terminating after the start and termination of a respective one of said third selected time intervals, and means connected between said output circuit and said first mentioned means and responsive only to the magnitude of the first signals in asid output circuit for controlling the magnitude of only said first signals provided by said first mentioned means.

7. In an electrical system, means for alternately and repetitively producing first signals occurring in first predetermined time intervals and second signals occurring in second predetermined time intervals, a plurality of amplifier stages connected in cascade, means connecting said first mentioned means to a first one of said plurality of amplifier stages, an output circuit, means connecting said output circuit to a second one of said plurality of amplifier stages, a plurality of gated clamps, each of said plurality of gated clamps having a closed condition and an open condition, means for connecting each of said plurality of gated clamps to a respective one of said amplifier stages, an additional gated clamp having a closed condition and an open condition, means connecting said additional gated clamp to said output circuit, means connected to said plurality of gated clamps for simultaneously maintaining each of said plurality of gated clamps in the closed condition during third predetermined time intervals, each of said third predetermined time intervals starting before and terminating after the start and termination of a respective one of said first predetermined time intervals, and means connected to said additional gated clamp for maintaining the additional gated clamp in the closed condition during fourth predetermined time intervals, each of said fourth predetermined time intervals starting before and terminating after the start and termination of a respective one of said third predetermined time intervals.

8. In an electrical system, means for alternately and repetitively producing undesired signals occurring in first predetermined time intervals and desired signals occurring in second predetermined time intervals, a plurality of amplifier stages connected in cascade, means connecting said first mentioned means to one of said amplifier stages, an output circuit, means connecting said output circuit to a second one of said amplifier stages, and means connected between said output circuit and said first mentioned means and responsive to the magnitude of only the undesired signals in said output circuit for controlling the magnitude of only said undesired signals provided by said first mentioned means.

9. In an electrical system, means for producing first signals and second signals occurring in first predetermined time intervals and third signals occurring in second predetermined time intervals, said first predetermined time intervals and said second predetermined time intervals occurring alternately and repetitively, a plurality of amplifier stages connected in cascade, means connecting said first mentioned means to a first one of said amplifier stages, a plurality of gated clamps, each of said plurality of gated clamps having an open condition and a closed condition, means connecting each of said plurality of gated clamps to a respective one of said amplifier stages, an output circuit, means connecting said output circuit to a second one of said plurality of amplifier stages, a plurality of gated clamps, each of said plurality of gated clamps having an open condition and a closed condition, means connecting each of said plurality of gated clamps to a respective one of said amplifier stages, means connected to said plurality of gated clamps for simultaneously maintaining each of the plurality of gated clamps in the closed condition during selected time intervals, each of said selected time intervals starting before and terminating after the start and termination of a respective one of said first predetermined time intervals, and means connected between said output circuit and said first mentioned means and responsive only to the magnitude of the first signals in said output circuit for controlling the magnitude of only said first signals provided by said first mentioned means.

10. In an electrical system, means for producing first signals and second signals occurring in first predetermined time intervals and third signals occurring in second predetermined time intervals, said first predetermined time intervals and said second predetermined time intervals occurring alternately and repetitively, a plurality of amplifier stages connected in cascade, means connecting said first mentioned means to a first one of said plurality of amplifier stages, an output circuit, means connecting said output circuit to a second one of said plurality of amplifier stages, a plurality of gated clamps, each of said plurality of gated clamps having a closed condition and an open condition, means for connecting each of said plurality of gated clamps to a respective one of said amplifier stages, an additional gated clamp having a closed condition and an open condition, means connecting said additional gated clamp to said output circuit, means connected to said plurality of gated clamps for simultaneously maintaining each of said plurality of gated clamps in the closed condition during third predetermined time intervals, each of said third predetermined time intervals starting before and terminating after the start and termination of a respective one of said first predetermined time intervals, means connected to said additional gated clamp for maintaining the additional gated clamp in the closed condition during fourth predetermined time intervals, each of said fourth predetermined time intervals starting before and terminating after the start and termination of a respective one of said third predetermined time intervals, and means connected between said output circuit and said first mentioned means and responsive only to the magnitude of the first signals in said output circuit for controlling the magnitude of only said first signals provided by said first mentioned means.

11. In an electrical system, a storage tube circuit including a first output circuit and a storage tube having at least a screen and a plate, a sweep circuit connected to said storage tube for providing the storage tube with write sweeps and read sweeps, a source of input signals providing intelligence signals, means connecting the source of input signals to said storage tube, a voltage regulator circuit including biasing means for providing a substantially constant bias and means for providing first control signals and second control signals, means for connecting said last mentioned means to the plate of said storage tube, means for connecting said biasing means to the screen of said storage tube, means connected to said voltage regulator circuit and to said sweep circuit for controlling the voltage regulator circuit and the sweep circuit such that each of said first control signals is applied to the plate of said storage tube and an undesired signal is applied to said first output circuit during a respective one of said write sweeps and such that each of said second control signals is applied to the plate of said storage tube during a respective one of said read sweeps, means connected to said storage tube, said source of input signals and said sweep circuit for controlling the storage tube circuit, the source of input signals and the sweep circuit such that each intelligence signal is applied to the storage tube during a respective write sweep and such that a desired signal is applied to said first output circuit during each read sweep, a plurality of amplifier stages connected in cascade, means connecting said first output circuit to a selected one of said plurality of amplifier stages, a second ouput circuit, means connecting said output circuit to a second one of said plurality of amplifier stages, means responsive to the magnitude of the undesired signals in the output of the second one of said plurality of amplifier stages for maintaining the magnitude of bias provided by said biasing means at a predetermined potential level, and means connecting said last mentioned means between a selected one of the plurality of amplifier stages and said voltage regulator circuit.

12. In an electrical system, means for producing first signals and second signals occurring in first predetermined time intervals and third and fourth signals occurring in second predetermined time intervals, said first predetermined time intervals and said second predetermined time intervals occurring alternately and repetitively, a plurality of amplifier stages connected in cascade, means connecting said first mentioned means to a first one of said amplifier stages, filter means for substantially suppressing said third signals and for passing said fourth signals, an output circuit, means for connecting said filter means between said output circuit and a second one of said plurality of amplifier stages, a plurality of gated clamps, each of said plurality of gated clamps having an open condition and a closed condition, means connecting each of said plurality of gated clamps to a respective one of said plurality of amplifier stages, an additional gated clamp having a closed condition and an open condition, means connecting said additional gated clamp to said filter means, means connected to said plurality of gated clamps for simultaneously maintaining each of said plurality of gated clamps in the closed condition during third predetermined time intervals, each of said third predetermined time intervals starting before and terminating after the start and termination of a respective one of said first predetermined time intervals, means connected to said additional gated clamp for maintaining the additional gated clamp in the closed condition during fourth predetermined time intervals, each of said fourth predetermined time intervals starting before and terminating after the start and termination of a respective one of said third predetermined time intervals, and means connected between a selected one of said plurality of amplifier stages and said first mentioned means and responsive only to the magnitude of the first signals in the selected amplifier stage for controlling the magnitude of only said first signals provided by said first mentioned means.

13. In an electrical system, means for alternately and repetitively producing first signals in first predetermined time intervals and second signals occurring in second predetermined time intervals, a plurality of amplifier stages connected in cascade, means connecting said first mentioned means to a first one of said plurality of amplifier stages, an output circuit, means connecting said output circuit to another one of said plurality of amplifier stages, a plurality of gated clamps, each of said plurality of gated clamps having a closed condition and an open condition, means connecting each of said plurality of gated clamps to a respective one of said amplifier stages, and means connected to said plurality of gated clamps for controlling said plurality of gated clamps such that each of the plurality of gated clamps are sequentially placed in the closed condition in a selected order and sequentially placed in the open condition in an order inverse to said selected order and such that the first of said plurality of gated clamps is maintained in the closed condition in selected time intervals, each of said selected time intervals starting before and terminating after a respective one of said first predetermined time intervals.

14. In an electrical system, means for alternately and repetitively producing first signals in first predetermined time intervals and second signals occurring in second predetermined time intervals, a plurality of amplifier stages connected in cascade, means connecting said first mentioned means to a first one of said plurality of amplifier stages, an output circuit, means connecting said output circuit to another one of said plurality of amplifier stages, a plurality of gated clamps, each of said plurality of gated clamps having a closed condition and an open condition, means connecting each of said plurality of gated clamps to a respective one of said amplifier stages, an additional gated clamp having a closed condition and an open condition, means connecting said additional gated clamp to said output circuit, and means connected to said plurality of gated clamps and said additional gated clamp for controlling said plurality of gated clamps and said additional gated clamp such that the additional gated clamp and each of the plurality of gated clamps are sequentially placed in the closed condition in a selected order and sequentially placed in the open condition in an order inverse to said selected order and such that the first of said plurality of gated clamps is maintained in the closed condition in selected time intervals, each of said selected time intervals starting before and terminating after a respective one of said first predetermined time intervals.

15. In an electrical system, a storage tube circuit including a storage tube and a first output circuit, sweep circuit connected to said storage tube for providing the storage tube with write sweeps and read sweeps, a source of input signals providing intelligence signals, means for connecting said source of input signals to said storage tube, means connected to said storage tube circuit, said source of input signals, and said sweep circuit for controlling the storage tube circuit, the source of input signals and the sweep circuit such that each intelligence signal is applied to the storage tube and an undesired signal is applied to said first output circuit during a respective write sweep and such that a desired signal is applied to said first output circuit during each of said read sweeps, a plurality of amplifier stages connected in cascade, means connecting said first output circuit to a first one of said plurality of amplifier stages, a second output circuit, means connecting said second output circuit to another one of said plurality of amplifier stages, a plurality of gated clamps, each of said plurality of gated clamps having a closed condition and an open condition, means for connecting each of said plurality of gated clamps to a respective one of said plurality of amplifier stages, means connected to said plurality of gated clamps for controlling said plurality of gated clamps such that each of the plurality of gated clamps is sequentially placed in the closed condition in a selected order and sequentially placed in the open condition in an order inverse to said selected order and such that the first of said plurality of gated clamps is maintained in the closed condition in selected time intervals, each of said selected time intervals starting before and terminating after a respective one of said first predetermined time intervals.

16. In an electrical system, means for alternately and repetitively producing first signals in first predetermined time intervals and second signals occurring in second predetermined time intervals, a plurality of amplifier stages connected in cascade, means connecting said first mentioned means to a first one of said plurality of amplifier stages, an output circuit, means connecting said output circuit to another one of said plurality of amplifier stages, a plurality of gated clamps, each of said plurality of gated clamps having a closed condition and an open condition, means connecting each of said plurality of gated clamps to a respective one of said amplifier stages, means connected to said plurality of gated clamps for controlling said plurality of gated clamps such that each of the plurality of gated clamps is sequentially placed in the closed condition in a selected order and sequentially placed in the open condition, in an order inverse to said selected order and such that the first of said plurality of gated clamps is maintained in the closed condition in selected time intervals, each of said selected time intervals starting before and terminating after a respective one of said first predetermined time intervals, and means connected between a selected one of said plurality of amplifier stages and said first mentioned means and responsive to only the magnitude of the first signals in said output circuit for controlling the magnitude of only said first signals provided by said first mentioned means.

17. In an electrical system, means for producing first signals and second signals occurring in first predetermined time intervals and third signals occurring in second predetermined time intervals, said first predetermined time intervals and said second predetermined time intervals occurring alternately and repetitively, a plurality of amplifier stages connected in cascade, means connecting said first mentioned means to a first one of said plurality of amplifier stages, an output circuit, means connecting said output circuit to a second one of said plurality of amplifier stages, a plurality of gated clamps, each of said plurality of gated clamps having a closed condition and an open condition, means connecting each of said plurality of gated clamps to a respective one of said amplifier stages, an additional gated clamp having a closed condition and an open condition, means connecting said additional gated clamp to said output circuit, means connected to said plurality of gated clamps and said additional gated clamp for controlling said plurality of gated clamps such that each of said plurality of gated clamps and said additional gated clamp is sequentially placed in the closed condition in a selected order and sequentially placed in the open condition in an order inverse to said selected order and such that the first of said plurality of gated clamps is maintained in the closed condition in selected time intervals, each of said selected time intervals starting before and terminating after a respective one of said first predetermined time intervals, and means connected between a selected one of said amplifier stages and said first mentioned means and responsive to only the magnitude of the first signals in the selected amplifier stage for controlling the magnitude of only said first signals provided by said first mentioned means.

18. In an electrical system, means for producing first signals having a first predetermined period, second signals having a second predetermined period, third signals having a first predetermined frequency and fourth signals having a second predetermined frequency, said first signals and said second signals occurring in first selected time intervals and said third signals and said fourth signals occurring in second selected time intervals, the first selected time intervals and the second selected time intervals occurring alternately and repetitively, a plurality of amplifier stages connected in cascade, each of said plurality of amplifier stages including a tuned circuit selected to substantially remove said first signals and said third signals, means connecting said first mentioned means to a first one of said plurality of amplifier stages, an output circuit, means connecting said output circuit to another one of said plurality of amplifier stages, a plurality of gated clamps, each of said plurality of gated clamps having an open condition and a closed condition, means connecting each of said plurality of gated clamps to a respective one of the tuned circuits, means connected to said plurality of gated clamps for controlling the plurality of gated clamps such that the plurality of gated clamps are simultaneously placed in the closed condition during third selected time intervals, each of said third selected time intervals starting before and terminating after the start and termination of a respective one of said first selected time intervals and such that said plurality of gated clamps are simultaneously placed in the open condition during fourth selected time intervals, each of said fourth selected time intervals starting after and terminating simultaneously with the start and termination of a respective one of said second selected time intervals.

19. In an electrical system, a storage tube circuit including a storage tube and a first output circuit, a sweep circuit connected to said storage tube for providing the storage tube with write sweeps and read sweeps, a source of input signals providing intelligence signals, means for connecting said source of input signals to said storage tube, means connected to said storage tube circuit, said source of input signals and said sweep circuit for controlling the storage tube circuit, the source of input signals and the sweep circuit such that each of said intelligence signals is applied to the storage tube and a first signal and a second signal are applied to said first output circuit during a respective write sweep and such that a third signal and a fourth signal are applied to said first output circuit during a respective read sweep, a plurality of amplifier stages connected in cascade, each of said plurality of amplifier stages including a tuned circuit selected to substantially remove the first signals and the third signals, means connecting said first output circuit to a first one of said plurality of amplifier stages, a second output circuit, means connecting said second output circuit to another one of said plurality of amplifier stages, a plurality of gated clamps, each of said plurality of gated clamps having a closed condition and an open condition, means for connecting each of said plurality of gated clamps to a respective one of said tuned circuits, means connected to said plurality of gated clamps for controlling the plurality of gated clamps such that the plurality of gated clamps are simultaneously placed in the closed condition during first selected time intervals, each of said first selected time intervals starting before and terminating after the start and termination of a respective one of the second signals and such that the plurality of gated clamps are placed in the open condition during second selected time intervals, each of said second selected time intervals starting after and terminating simultaneously with the start and termination of a respective one of the fourth signals.

20. In an electrical system, a storage tube circuit including a storage tube and a first output circuit, a sweep circuit connected to said storage tube for providing the storage tube with write sweeps and read sweeps, a source of input signals providing intelligence signals, means for connecting said source of input signals to said storage tube, means connected to said storage tube circuit, said source of input signals and said sweep circuit for controlling the storage tube circuit, the source of input signals and the sweep circuit such that each of said intelligence signals is applied to the storage tube and a first signal and a second signal are applied to said first output circuit during a respective write sweep and such that a third signal and a fourth signal are applied to said first output circuit during a respective read sweep, a plurality of amplifier stages connected in cascade, each of said plurality of amplifier stages including a tuned circuit selected to substantially remove the first signals and the third signals, means connecting said first output circuit to a first one of said plurality of amplifier stages, a second output circuit, means connecting said second output circuit to another one of said plurality of amplifier stages, a plurality of gated clamps, each of said plurality of gated clamps having a closed condition and an open condition, means connecting each of said plurality of gated clamps to a respective one of said tuned circuits, means connected to said plurality of gated clamps for controlling the plurality of gated clamps such that the plurality of gated clamps are placed in the closed condition during first selected time intervals, each of said first selected time intervals starting before and terminating after the start and termination of a respective one of said second signals and such that each of said plurality of gated clamps is sequentially placed in the open condition in a first predetermined order and sequentially placed in the closed condition in an order inverse to said first predetermined order such that the first one of said plurality of gated clamps placed in the open condition is maintained therein during fourth selected time intervals, each of said fourth selected time intervals starting after and terminating simultaneously with the start and termination of a respective one of said fourth signals.

21. In an electrical system, means for producing first signals having a first predetermined period, second signals having a second predetermined period, third signals having a first predetermined frequency and fourth signals having a second predetermined frequency, said first signals and said second signals occurring in first selected time intervals and said third signals and said fourth signals occurring in second selected time intervals, the first selected time intervals and the second selected time intervals occurring alternately and repetitively, a plurality of amplifier stages connected in cascade, each of said plurality of amplifier stages including a tuned circuit selected to substantially remove said first signals and said third signals, means connecting said first mentioned means to a first one of said plurality of amplifier stages, an output circuit, means connecting said output circuit to another one of said plurality of amplifier stages, a plurality of gated clamps, each of said plurality of gated clamps having an open condition and a closed condition, means connecting each of said plurality of gated clamps to a respective one of the tuned circuits, means connected to said plurality of gated clamps for controlling the plurality of gated clamps such that the plurality of gated clamps are placed in the closed condition during third selected time intervals, each of said third selected time intervals starting before and terminating after the start and termination of a respective one of said first selected time intervals and such that each of said plurality of gated clamps is sequentially placed in the open condition in a first predetermined order and sequentially placed in the closed condition in an order inverse to said first predetermined order such that the first one of said plurality of gated clamps placed in the open condition is maintained therein during fourth selected time intervals, each of said fourth selected time intervals starting after and terminating simultaneously with the start and termination of a respective one of said second selected time intervals.

22. In an electrical system, means for producing first signals having a first predetermined period, second signals having a second predetermined period, third signals having a first predetermined frequency, and fourth signals having a second predetermined frequency, said first signals and said second signals occurring in first selected time intervals and said third signals and said fourth signals occurring in second selected time intervals, the first selected time intervals and the second selected time intervals occurring alternately and repetitively, a plurality of amplifier stages connected in cascade, each of said plurality of amplifier stages including a tuned circuit selected to substantially remove said first signals and said third signals, means connecting said first mentioned means to a first one of said plurality of amplifier stages, an output circuit, means connecting said output circuit to another one of said plurality of amplifier stages, a plurality of gated clamps, each of said plurality of gated clamps having an open condition and a closed condition, means connecting each of said plurality of gated clamps to a respective one of the tuned circuits, means connected to said plurality of gated clamps for controlling the plurality of gated clamps such that the gated clamps are placed in the closed condition during third selected time intervals, each of said third selected time intervals starting before and terminating after the start and termination of a respective one of said first selected time intervals and such that each of said plurality of gated clamps is sequentially placed in the open condition in a first selected order and simultaneously placed in the closed condition such that the first one of said plurality of gated clamps placed in the open condition is maintained therein during fourth selected time intervals, each of said fourth selected time intervals starting before and terminating simultaneously with a respective one of said second selected time intervals.

References Cited in the file of this patent

UNITED STATES PATENTS

| | | |
|---|---|---|
| 2,685,682 | Sepahban | Aug. 3, 1954 |
| 2,706,246 | Klemperer | Apr. 12, 1955 |
| 2,777,059 | Stites | Jan. 8, 1957 |